US007134192B1

(12) United States Patent
Savicki et al.

(10) Patent No.: US 7,134,192 B1
(45) Date of Patent: Nov. 14, 2006

(54) CLOSURE DEVICE

(75) Inventors: Alan F. Savicki, Oswego, IL (US); John C. Ware, Acworth, GA (US)

(73) Assignee: The Glad Products Company, Oakland, CA (US)

(*) Notice: Subject to any disclaimer, the term of this patent is extended or adjusted under 35 U.S.C. 154(b) by 0 days.

(21) Appl. No.: 09/979,579

(22) PCT Filed: Jun. 10, 1999

(86) PCT No.: PCT/US99/13091

§ 371 (c)(1), (2), (4) Date: Nov. 16, 2001

(87) PCT Pub. No.: WO00/76687

PCT Pub. Date: Dec. 21, 2000

(51) Int. Cl.
*B29D 5/00* (2006.01)
*A44B 19/24* (2006.01)

(52) U.S. Cl. .................... 29/766; 24/416; 24/417; 24/427; 383/64; 383/65

(58) Field of Classification Search .............. 24/399, 24/400, 416, 417, 427; 383/63, 64, 65, 69; 29/766
See application file for complete search history.

(56) References Cited

U.S. PATENT DOCUMENTS

| 2,929,123 | A | | 3/1960 | Schneideman | |
|---|---|---|---|---|---|
| 3,115,689 | A | * | 12/1963 | Jacobs ......................... | 24/399 |
| 3,234,614 | A | * | 2/1966 | Plummer ...................... | 24/400 |
| 3,713,923 | A | * | 1/1973 | Laguerre ...................... | 156/66 |
| 4,135,285 | A | | 1/1979 | Weiner | |
| 4,523,377 | A | | 6/1985 | Spletzer et al. | |
| 5,142,773 | A | | 9/1992 | Yunoki | |
| 5,301,394 | A | * | 4/1994 | Richardson et al. .......... | 24/399 |
| 5,369,865 | A | | 12/1994 | Hirokawa et al. | |

* cited by examiner

*Primary Examiner*—Jermie E. Cozart
(74) *Attorney, Agent, or Firm*—Thomas C. Feix

(57) ABSTRACT

The closure device (121) includes interlocking fastening strips (130, 131) and a slider (132) slidably disposed on the fastening strips for facilitating the occlusion and deocclusion of the fastening strips (130, 131) when moved towards first and second ends thereof. A slider (132) is provided for facilitating the attachment of the slider (132) onto the fastening strips (130, 131) in the horizontal X axis (102). The slider (132) provides resistance against the removal of the slider (132) from the fastening strips (130, 131) in the horizontal X axis (102) and the vertical Z axis (106).

50 Claims, 18 Drawing Sheets

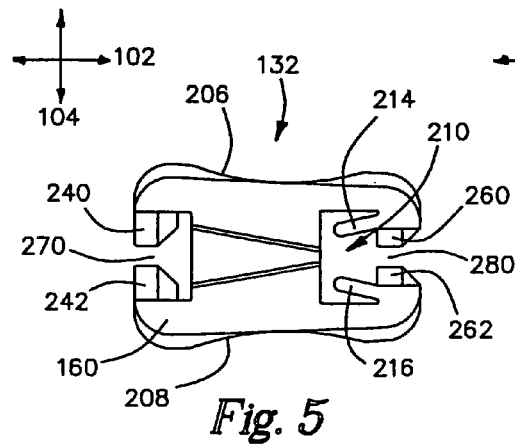
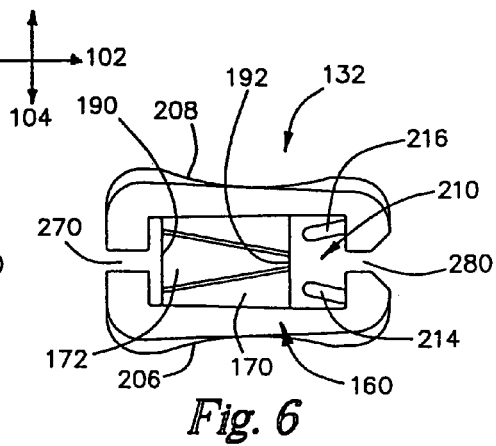
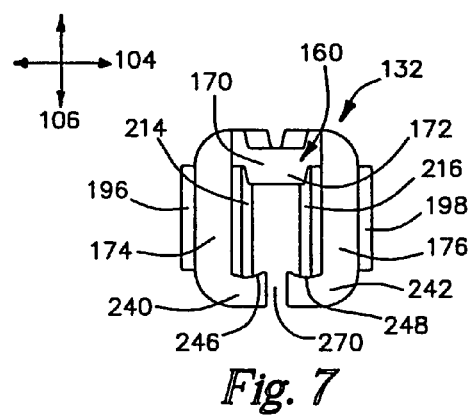
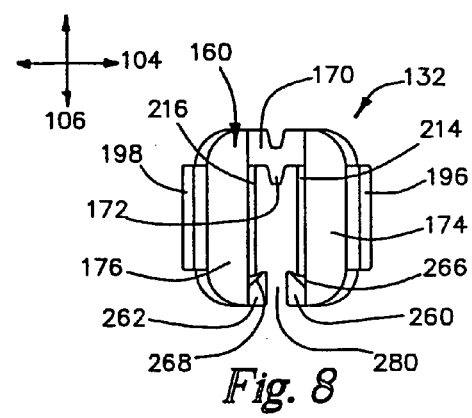
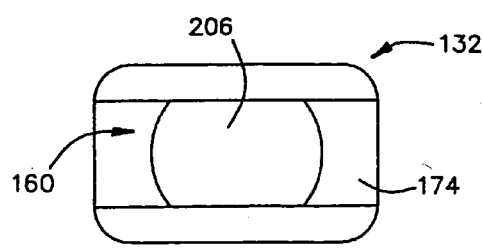

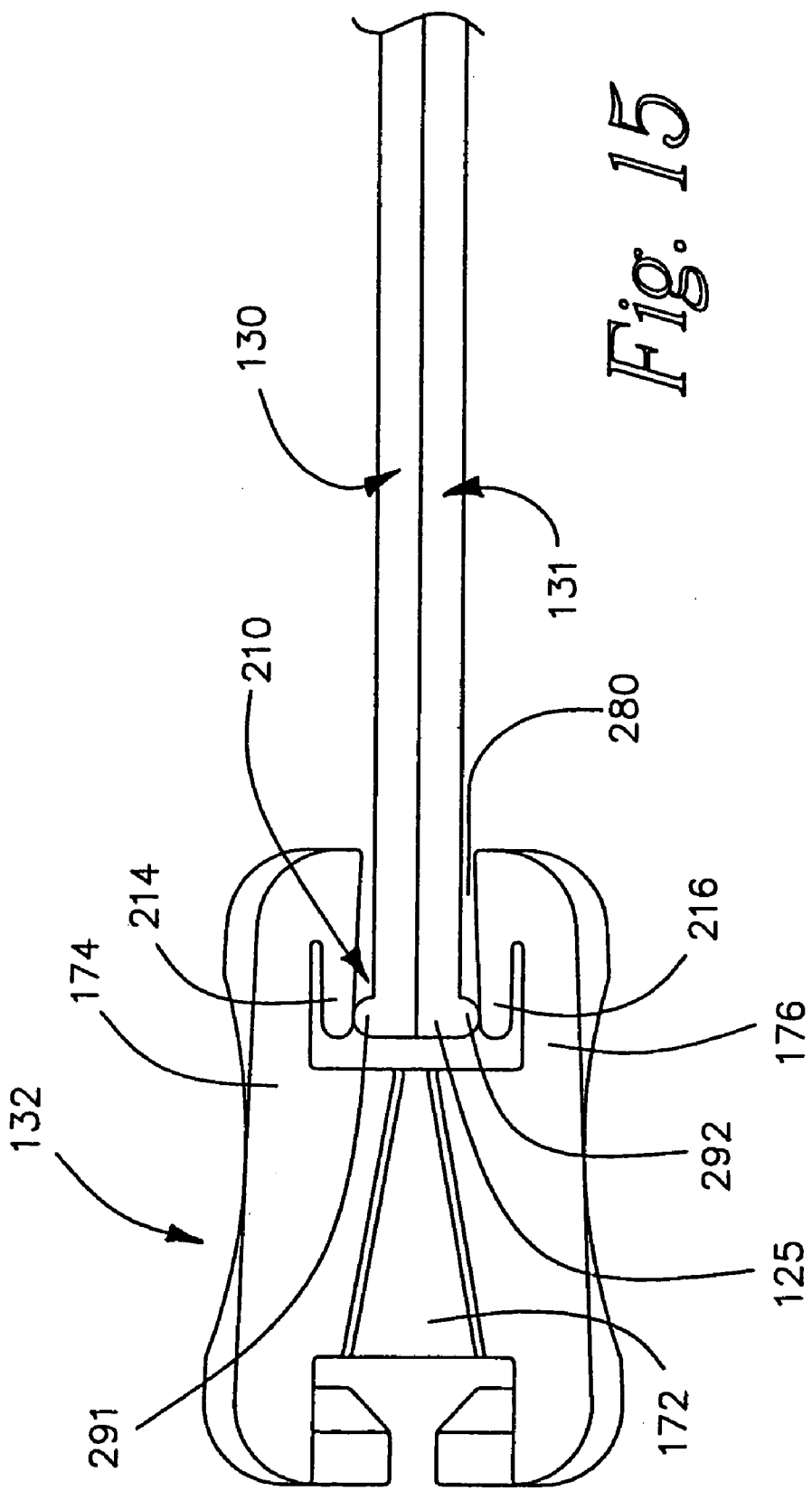

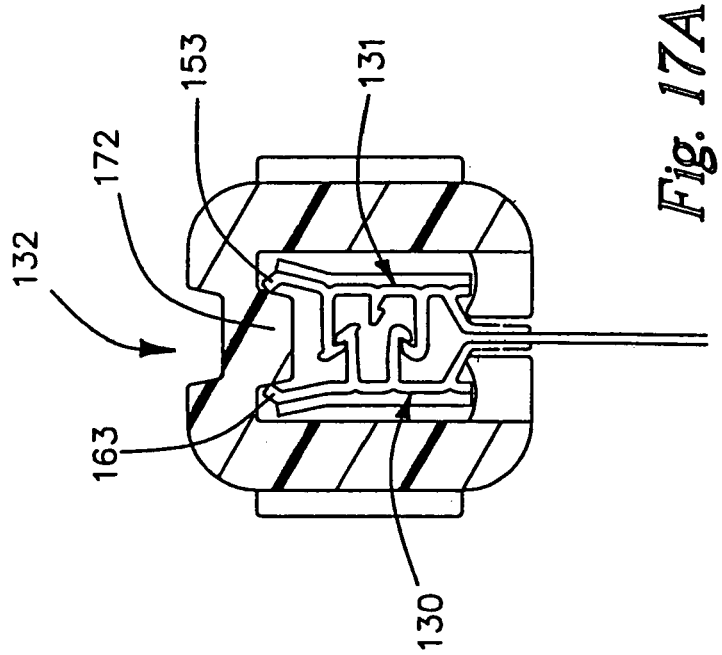
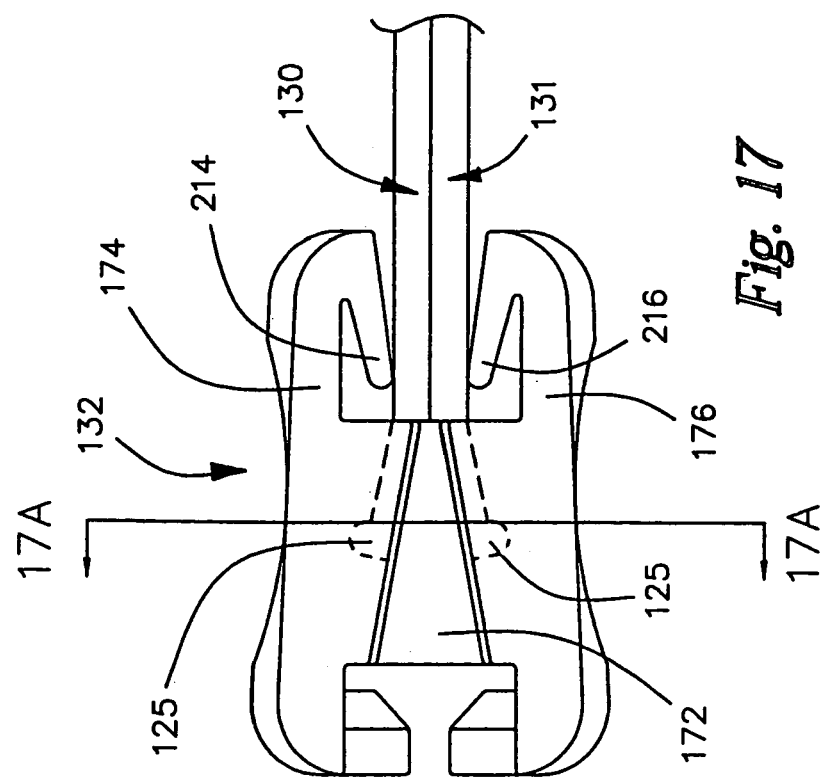

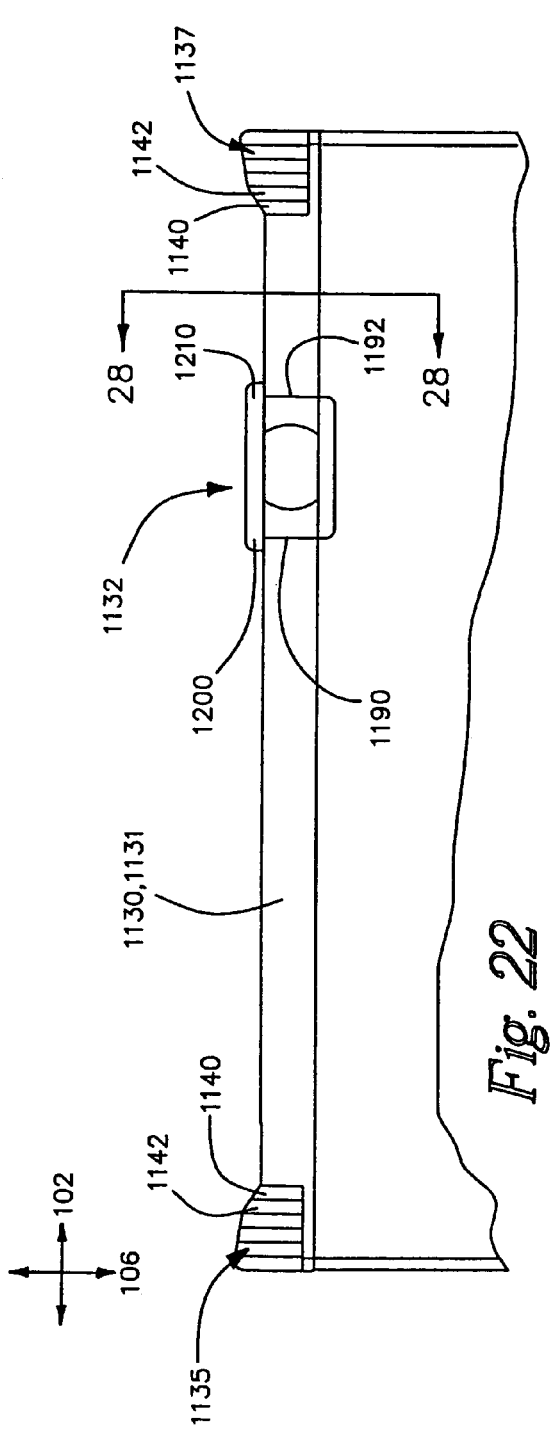
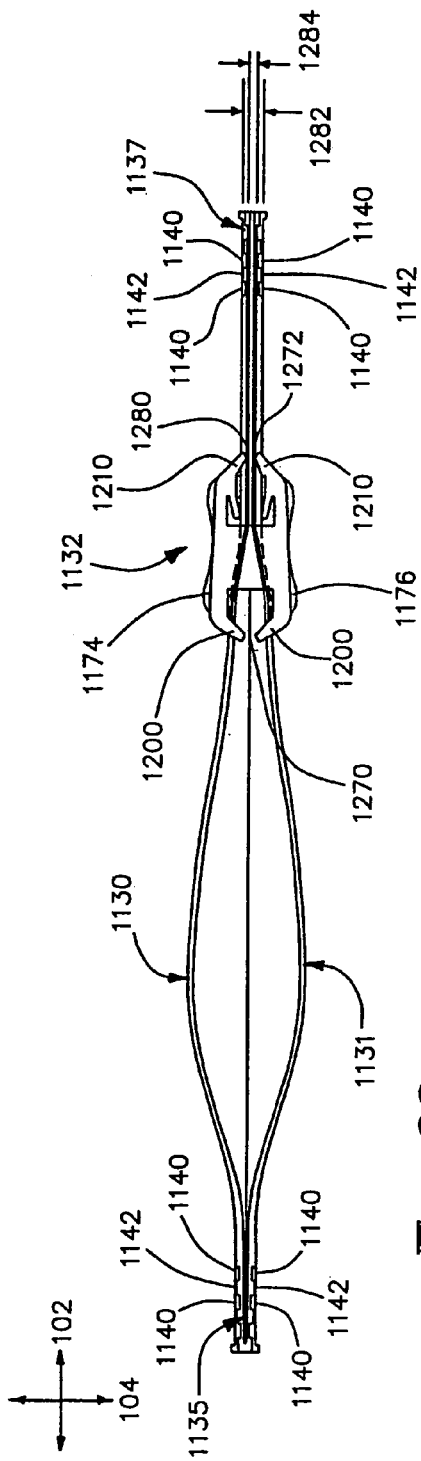

CLOSURE DEVICE

FIELD OF THE INVENTION

The present invention relates generally to closure devices and, more particularly, to a slider, interlocking fastening strips, and a method of assembly. The inventive closure device and method may be employed in traditional fastener areas, and is particularly well suited for fastening flexible storage containers, including plastic bags.

BACKGROUND OF THE INVENTION

The use of closure devices for fastening storage containers, including plastic bags, is generally well known. Furthermore, the manufacture of closure devices made of plastic materials is generally known to those skilled in the art, as demonstrated by the numerous patents in this area.

A particularly well-known use for closure devices is in connection with flexible storage containers, such as plastic bags. In some instances, the closure device and the associated container are formed from thermoplastic materials, and the closure device and the side walls of the container are integrally formed by extrusion as a single piece. Alternatively, the closure device and side walls of the container may be formed as separate pieces and then connected by heat sealing or any other suitable connecting process. In either event, such closure devices are particularly useful in providing a closure means for retaining matter within the bag.

Conventional closure devices typically utilize mating fastening strips or closure elements which are used to selectively seal the bag. With such closure devices, however, it is often difficult to determine whether the fastening strips are fully occluded. This problem is particularly acute when the strips are relatively narrow. Accordingly, when such fastening strips are employed, there exists a reasonable likelihood that the closure device is at least partially open.

Such fastening strips are also particularly difficult to handle by individuals with limited manual dexterity. Thus, in order to assist these individuals and for ease of use by individuals with normal dexterity, the prior art has also provided sliders for use in opening and closing the fastening strips, as disclosed, for example, in U.S. Pat. Nos. 4,199,845, 5,007,142, 5,007,143, 5,010,627, 5,020,194, 5,070,583, 5,283,932, 5,301,394, 5,426,830, 5,431,760, 5,442,838, and 5,448,808.

During assembly of closure devices utilizing sliders, the sliders are often mounted onto fastening strips by moving the slider over the fastening strips in the vertical Z axis. Specifically, if the longitudinal axis of the fastening strips and slider is the X axis, the width is the transverse Y axis and the height is the vertical Z axis, the slider is attached to the fastening strips by moving the slider over the fastening strips in the vertical Z axis. In the past, sliders attached in the vertical Z axis have utilized folding design with the hinge along the X axis such as the sliders in U.S. Pat. Nos. 5,010,627, 5,067,208, 5,070,583, and 5,448,808.

Other sliders have used multiple parts which are assembled together such as the sliders in U.S. Pat. Nos. 5,007,142, 5,283,932 and 5,426,830.

Another method of installing a slider is shown in U.S. Pat. No. 5,431,760.

It would be desirable to have a continuous process for attaching a slider to the end of the fastening strips in the horizontal X axis. Such a device would reduce the manufacturing costs of closure devices utilizing sliders in addition to providing an effective and reliable means of attaching sliders to the fastening strips.

OBJECTS OF THE INVENTION

Accordingly, a general object of the present invention is to provide a slider which overcomes the deficiencies of the prior art.

A more specific object of the present invention is to provide a slider that may be attached to fastening strips in the horizontal X axis.

A further object of the present invention is to provide a slider that may be attached to the end of the fastening strips in the horizontal X axis.

Another object of the present invention is to provide a slider that once attached prevents itself from being removed from fastening strips thereafter.

SUMMARY OF THE INVENTION

The inventive closure device is intended for use with a storage container which includes a pair of complementary sheets or opposing flexible side walls, such as a plastic bag. The closure device includes interlocking fastening strips disposed along respective edge portions of the opposing side walls, and a slider slidably disposed on the interlocking fastening strips for facilitating the occlusion and deocclusion of the fastening strips when moved towards first and second ends thereof. In accordance with the present invention, a method is provided for facilitating the attachment of the slider onto the fastening strips in the horizontal X axis. In addition, the slider and fastening strips engage to prevent removal of the slider from the fastening strips in the horizontal X axis. Additionally, the slider includes offsets which provide resistance against the removal of the slider from the fastening strips in the vertical Z axis.

These and other objects, features, and advantages of the present invention will become more readily apparent upon reading the following detailed description of exemplified embodiments and upon reference to the accompanying drawings herein.

BRIEF DESCRIPTION OF THE DRAWINGS

FIG. 5 is a top view of the slider in FIG. 2;

FIG. 6 is a bottom view of the slider in FIG. 2;

FIG. 7 is a front view of the slider in FIG. 2;

FIG. 8 is a rear view of the slider in FIG. 2;

FIG. 9 is a right side view of the slider in FIG. 2;

FIG. 15 is a top view of the slider and the fastening strips and illustrates their respective positions to one another as the fastening strips are positioned onto the slider;

FIG. 17 is a top view of the slider and the fastening strips and illustrates their respective positions to one another as the fastening strips are positioned onto the slider;

FIG. 17A is a cross-sectional view taken along line 17A—17A in FIG. 17;

FIG. 22 is a side view of another embodiment of the slider and a side view of another embodiment of the fastening strips;

FIG. 23 is a top view of the slider and fastening strips in FIG. 22;

While the present invention will be described and disclosed in connection with certain embodiments and procedures, the intent is not to limit the present invention to these embodiments and procedures. On the contrary, the intent is to cover all such alternatives, modifications, and equivalents that fall within the spirit and scope of the present invention as defined by the appended claims.

DESCRIPTION OF THE EMBODIMENTS

Figure 1:
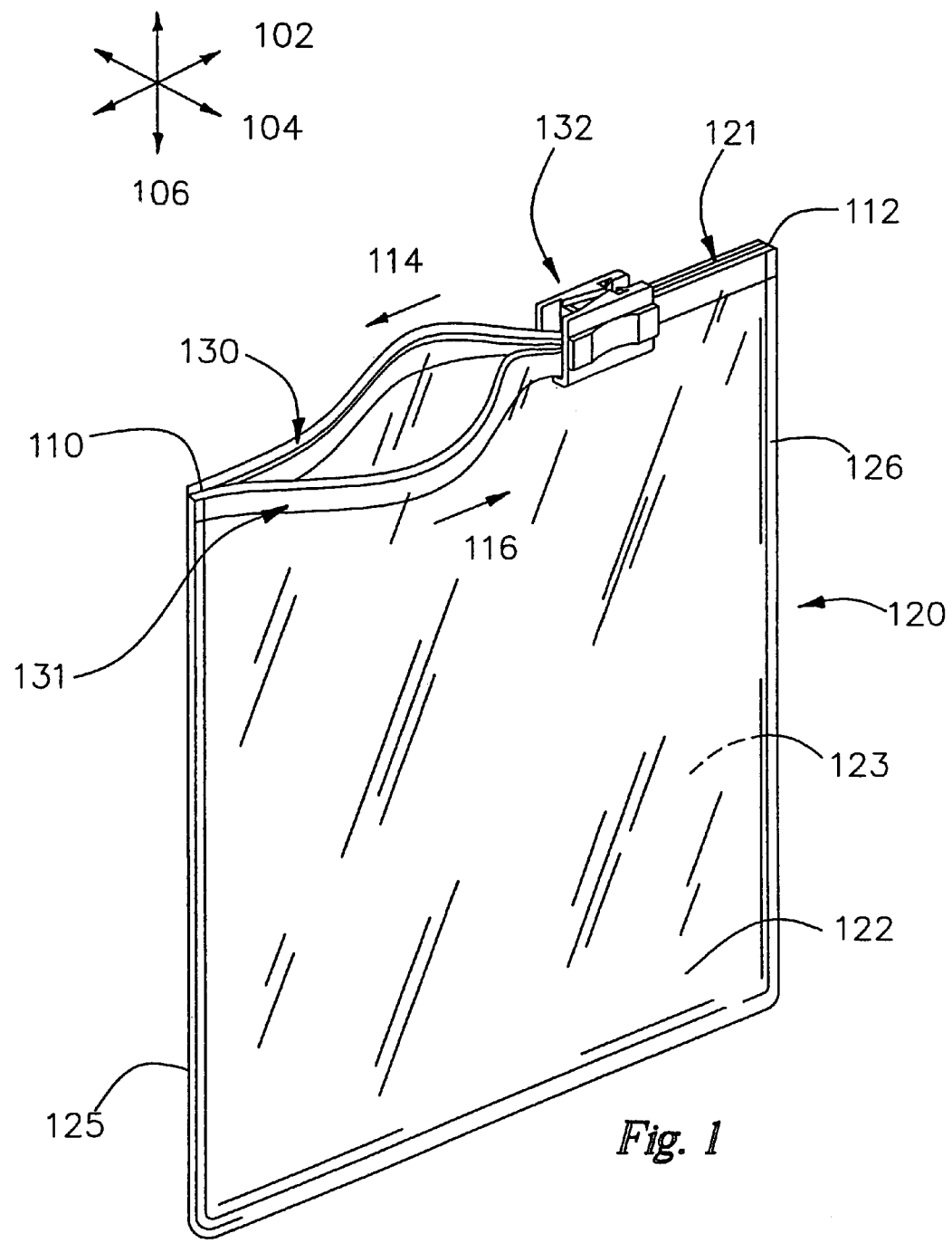
FIG. 1 is a perspective view of a container according to the present invention in the form of a plastic bag.
Figure 2:
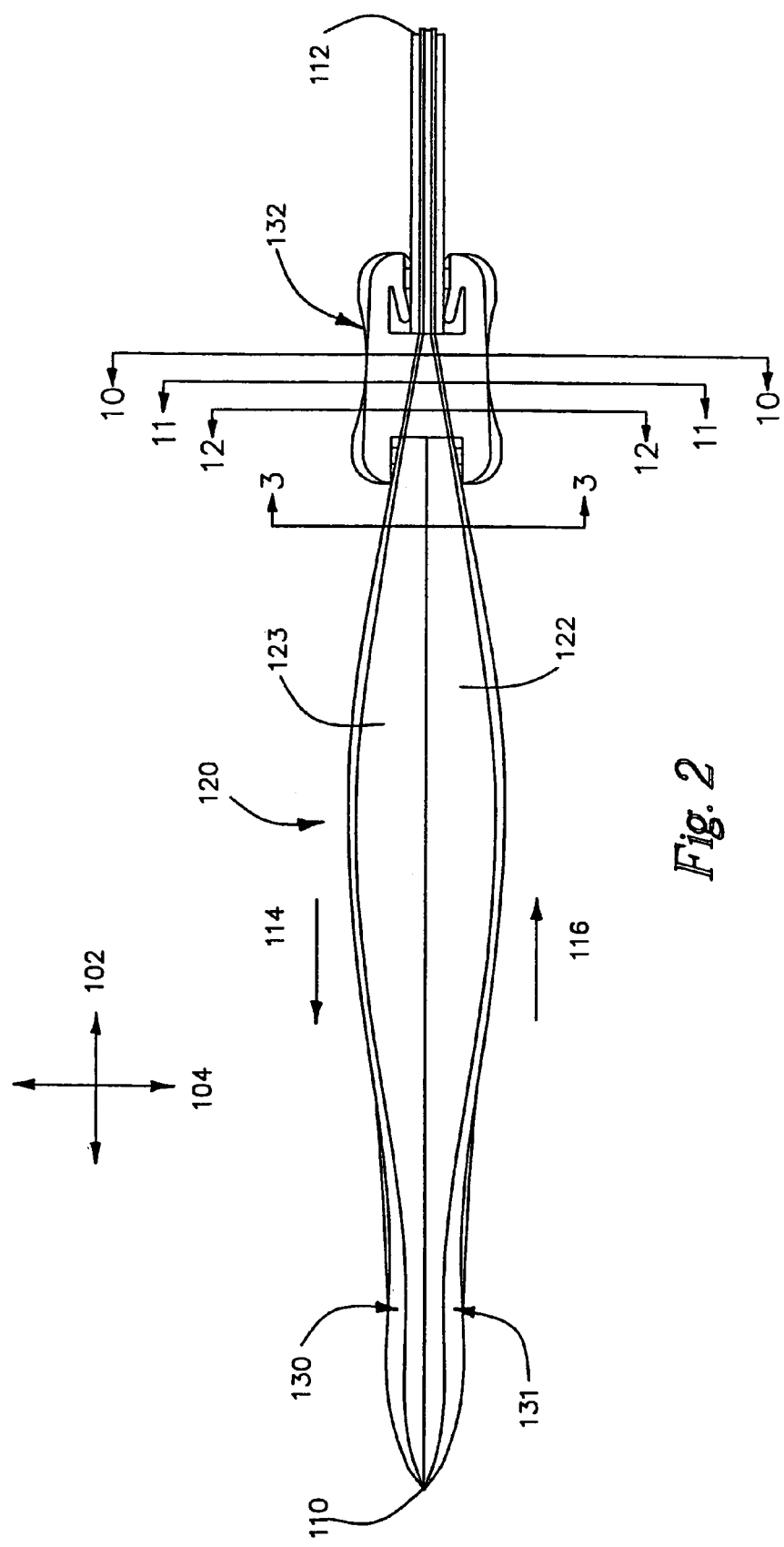
FIG. 2 is a top view of the container in FIG. 1.

FIGS. 1 and 2 illustrate a container in the form of a plastic bag 120 having a sealable closure device 121. The bag 120 includes side walls 122, 123 joined at seams 125, 126 to form a compartment sealable by means of the closure device 121. The closure device 121 comprises first and second fastening strips 130, 131 and a slider 132.

The fastening strips 130, 131 and the slider 132 have a longitudinal X axis 102 and a transverse Y axis 104 which is perpendicular to the longitudinal X axis 102. Also, the fastening strips 130, 131 have a vertical Z axis 106 which is perpendicular to the longitudinal X axis 102 and which is perpendicular to the transverse Y axis 104.

In use, the slider 132 of the present invention facilitates the occlusion and deocclusion of the interlocking fastening strips 130, 131 when moved in the appropriate direction along the longitudinal X axis 102 of the fastening strips 130, 131. In particular, the slider 132 facilitates the occlusion of the interlocking fastening strips 130, 131 when moved towards a first end 110 thereof, and facilitates the deocclusion of the interlocking fastening strips 130, 131 when moved towards a second end 112 thereof. When the slider 132 is moved in an occlusion direction, as indicated by reference numeral 114 in FIGS. 1 and 2, closure of the fastening strips 130, 131 occurs. Conversely, when the slider 132 is moved in a deocclusion direction, as indicated by reference numeral 116, separation of the fastening strips 130, 131 occurs.

In keeping with a general aspect of the present invention and as will be described in greater detail below, the interlocking fastening strips 130, 131 of the present invention may be of virtually any type or form including, for example: (1) U-channel fastening strips as best shown herein at FIGS. 3 and 4; (2) "arrowhead-type" fastening strips, as shown herein at FIG. 28; and/or (3) "profile" fastening strips, as disclosed in U.S. Pat. No. 5,664,299 and as shown herein at FIG. 29. All of the above-identified patents and applications are hereby incorporated by reference in their entireties.

Figure 3:
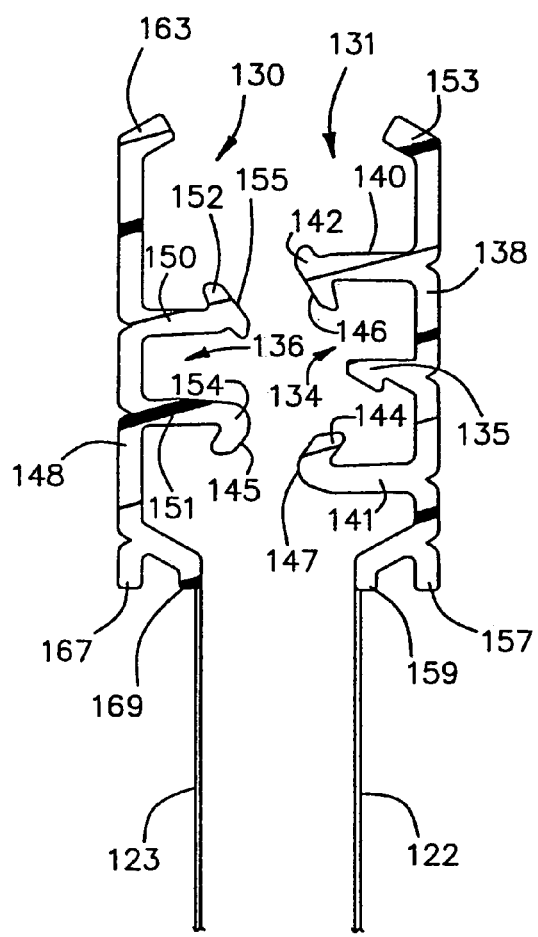
FIG. 3 is a partial cross-sectional view of the fastening strips taken along line 3—3 in FIG. 2.
Figure 4:
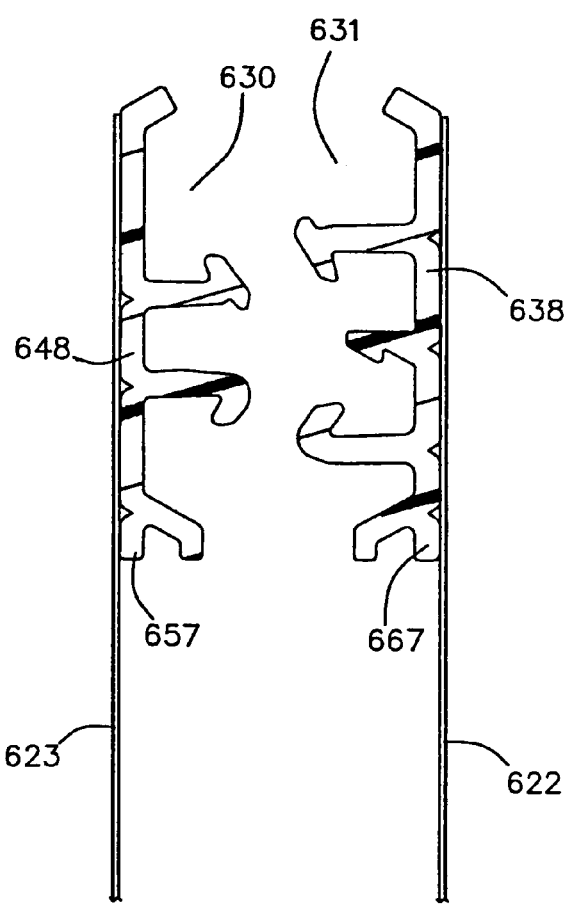
FIG. 4 is another embodiment of attaching the fastening strips to the side walls of the container.

An illustrative example of the type of closure device that may be used with the present invention is shown in FIG. 3. The fastening strips include a first fastening strip 130 with a first closure element 136 and a second fastening strip 131 with a second closure element 134. The first closure element 136 engages the second closure element 134. The first fastening strip 130 may include an upper flange 163 disposed at the upper end of the first fastening strip 130 and a lower flange 167 and an offset 169, each disposed at the lower end of the first fastening strip 130. The offset 169 is at angle of approximately 60° to the lower flange 167. Likewise, the second fastening strip 131 may include an upper flange 153 disposed at the upper end of the second fastening strip 131 and a lower flange 157 and an offset 159, each disposed at the lower end of the second fastening strip 131. The offset 159 is at angle of approximately 60° to the lower flange 157. The side walls 122, 123 of the plastic bag 120 may be attached to the offsets 159, 169 of their respective fastening strips 130, 131 by conventional manufacturing techniques. As shown in FIG. 4, the side walls 622, 623 of the bag may also be attached to the outside surfaces of their respective fastening strips 630, 631, where the outside surfaces comprise the lower flanges 657, 667 and the base portions 638, 648.

The second closure element 134 includes a base portion 138 having a pair of spaced-apart parallely disposed webs 140, 141, extending from the base portion 138. The webs 140, 141 include hook closure portions 142, 144 extending from the webs 140, 141 respectively, and facing towards each other. The hook closure portions 142, 144 include guide surfaces 146, 147 which serve to guide the hook closure portions 142, 144 for occluding with the hook closure portions 152, 154 of the first closure element 136.

The first closure element 136 includes a base portion 148 including a pair of spaced-apart, parallely disposed webs 150, 151 extending from the base portion 148. The webs 150, 151 include hook closure portions 152, 154 extending from the webs 150, 151 respectively and facing away from each other. The hook closure portions 152, 154 include guide surfaces 145, 155, which generally serve to guide the hook closure portions 152, 154 for occlusion with the hook closure portions 142, 144 of the second closure element 134. The guide surfaces 145, 155 may also have a rounded crown surface. In addition, the hook closure portions 144, 154 may be designed so that the hook closure portions 144, 154 adjacent the interior of the container provide a greater resistance to opening the closure device 121.

The second fastening strip 131 may or may not include color enhancement member 135 which is described in U.S. Pat. No. 4,829,641 and which is incorporated herein by reference.

Referring to FIGS. 5–9, the slider 132 includes a housing 160 having a top portion 170, a first side portion 174, and a second side portion 176. The top portion 170 provides a separator 172 having a first end 190 and a second end 192 where the first end 190 is wider than the second end 192. The separator 172 is triangular in shape as shown in FIG. 6.

The top portion 170 of the slider merges into a first side portion 174 and a second side portion 176. As viewed in FIG. 7, the first side portion 174 merges into the first front shoulder 240. Likewise, the second side portion 176 merges into the second front shoulder 242. The front shoulders 240, 242 extend inwardly in the transverse Y axis 104 thereby forming a front slot 270 of substantially uniform width as seen in FIGS. 5 and 6. The front shoulders 240, 242 provide radial upper surfaces or concave surfaces 246, 248 to maintain proper orientation of the fastening strips 130, 131 within the slider 132.

Similarly, as viewed in FIG. 8, the first side portion 174 merges into the first rear shoulder 260. Also, the second side portion 176 merges into the second rear shoulder 262. The rear shoulders 260, 262 angle inwardly in the transverse Y axis 104 thus forming a rear slot 280 of substantially uniform width. The rear shoulders 260, 262 also provide radial upper surfaces or concave surfaces 266, 268 to maintain proper orientation of the fastening strips 130, 131 within the slider 132.

The first side portion 174 has a first grip 196. Likewise, the second side portion 176 has a second grip 198. The first grip 196 and the second grip 198 extend laterally along the outer surfaces of the side portions 174, 176 and provide inwardly protruding radial gripping surfaces 206, 208 as viewed in FIGS. 5 and 6. The radial surfaces 206, 208 are designed to correspond to the contour of a person's fingertips and facilitate grasping the slider 132 during occlusion or deocclusion of the fastening strips 130, 131.

The slider also provides a flexible occlusion member 210 to force the fastening strips 130, 131 together thus effectuating occlusion of the fastening strips 130, 131 when the slider 132 is moved in the occlusion direction 114. The flexible occlusion member 210 includes a pair of flexible arms 214, 216. The two flexible arms 214, 216 angle inwardly from their respective side portions 174, 176 and project toward the front of the slider 132 as most easily seen in FIGS. 5 and 6.

In accordance with a principal aspect of the present invention, a slider 132 is provided for attaching the slider 132 to the fastening strips 130, 131 in the horizontal X axis 102 while preventing the slider 132 from being removed from the fastening strips 130, 131 in the horizontal X axis 102 and in the vertical Z axis 106 thereafter.

Figure 12:
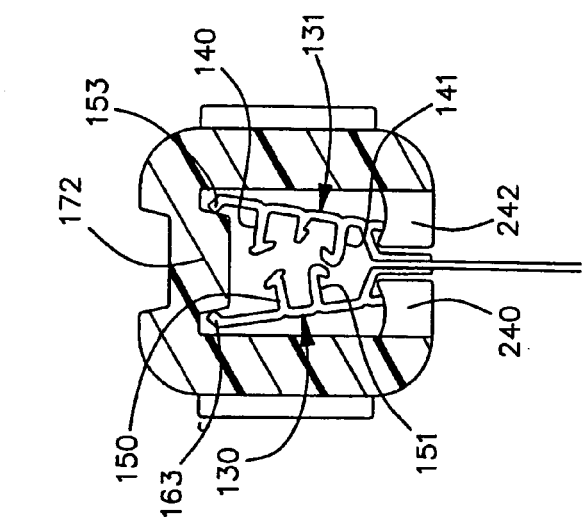
FIG. 12 is a cross-sectional view taken along line 12—12 in FIG. 2.
Figure 11:
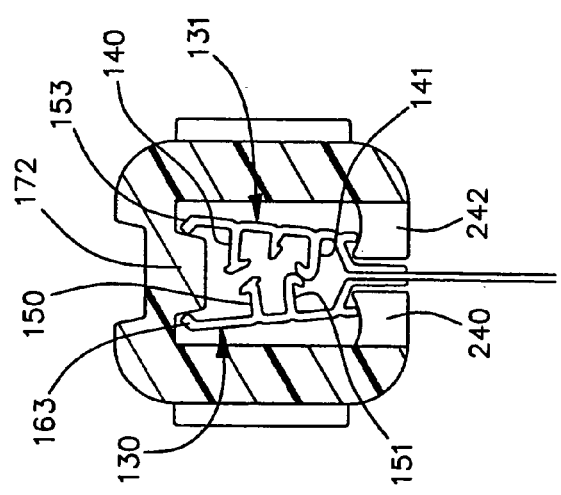
FIG. 11 is a cross-sectional view taken along line 11—11 in FIG. 2.
Figure 10:
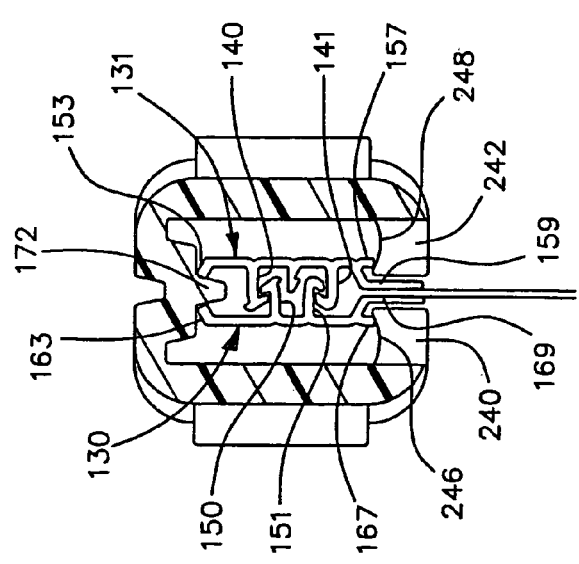
FIG. 10 is a cross-sectional view taken along line 10—10 in FIG. 2.

FIGS. 10–12 illustrate the fastening strips 130, 131 at different locations along the separator 172 of the slider 132. FIG. 10 depicts the fastening strips 130, 131 at a location near the second end 192 (the narrow end) of the separator 172. The separator 172 is located between the flanges 153, 163 of the fastening strips 130, 131. At this location, the upper webs 140, 150 and the lower webs 141, 151 are occluded. FIG. 11 illustrates the fastening strips 130, 131 at a location along the separator 172. The width of the separator 172 at this location forces the fastening strips 130, 131 apart in the transverse Y axis 104 and the upper webs 140, 150 of the fastening strips 130, 131 are deoccluded. FIG. 12 shows the fastening strips 130, 131 near the first end 190 (the wide end) of the separator 172. At this position, the width of the separator 172 deoccludes both the upper webs 140, 141 and the lower webs 150, 151 of the fastening strips 130, 131. The flanges 153, 163 of the fastening strips 130, 131 are the only separator 172 engaging surfaces of the fastening strips 130, 131. Consequently, the slider 132 need not force itself between the webs 140, 141, 150, 151 of the fastening strips 130, 131.

As an aspect of the present invention, the shoulders 240, 242, 260, 262 prevent removal of the slider 132 from the fastening strips 130, 131 in the vertical Z axis 106 after the slider 132 has been attached to the fastening strips 130, 131. Moreover, the shoulders 240, 242, 260, 262 of the slider 132 provide upper radial or concave surfaces 246, 248, 266, 268 which engage the lower flanges 157, 167 of the fastening strips 130, 131 to retain the proper orientation of the fastening strips 130, 131 within the slider 132. In the event removal of the slider 132 in the vertical Z axis 106 is attempted, the shoulders 240, 242, 260, 262 will provide resistance against removal of the slider 132. The shoulders 240, 242, 260, 262 retain the slider 132 on the fastening strips 130, 131 by resisting vertical Z axis 106 movement of the fastening strips 130, 131 through the slots 270, 280. Referring to FIG. 10, if the slider 132 was pulled upward in the Z axis 106, the offset 159 engages the offset 169 to prevent the fastening strips from entering the slots 270, 280. In addition, the lower flanges 157, 167 engage the upper radial or concave surfaces 246, 248, 266, 268 to prevent the fastening strips from entering the slots 270, 280. As a result, the slider 132 may only be removed from the fastening strips 130, 131 in the vertical Z axis 106 by either tearing through the fastening strips 130, 131 or breaking and/or by deforming the shoulders 240, 242, 260, 262 of the slider 132.

Figure 13:
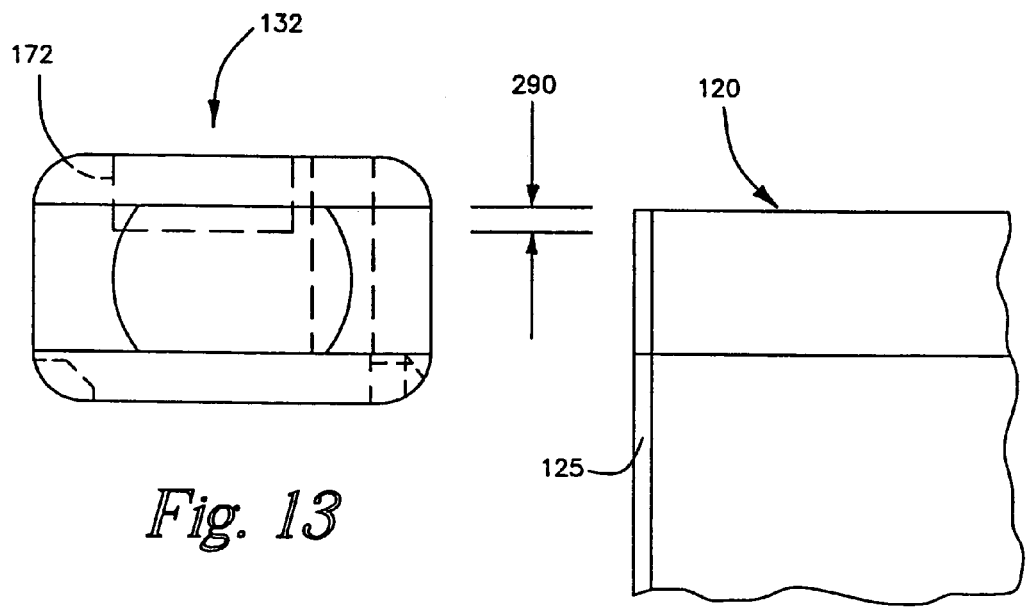
FIG. 13 is a right side view of the slider in FIG. 2 and a fragmentary side view of the container in FIG. 2.

FIG. 13 illustrates the respective vertical positions of the slider 132 and container 120 immediately prior to attaching the slider 132 onto the fastening strips 130, 131. The container 120 provides a seam 125 at the end of the fastening strips 130, 131. At the seam 125, the fastening strips 130, 131 are melted together which effectively occludes the fastening strips 130, 131. During attachment of the slider onto the fastening strips in the horizontal X axis 102, the separator 172 of the slider 132 extends below the top of the fastening strips 130, 131 a distance 290. Consequently, the seam 125 of the fastening strips has an opening at least a minimum distance 290 from the top of the fastening strips 130, 131 to permit insertion of the separator 172 between the fastening strips 130, 131 during attachment of the slider 132 onto the fastening strips 130, 131 in the horizontal X axis 102.

Figure 14:
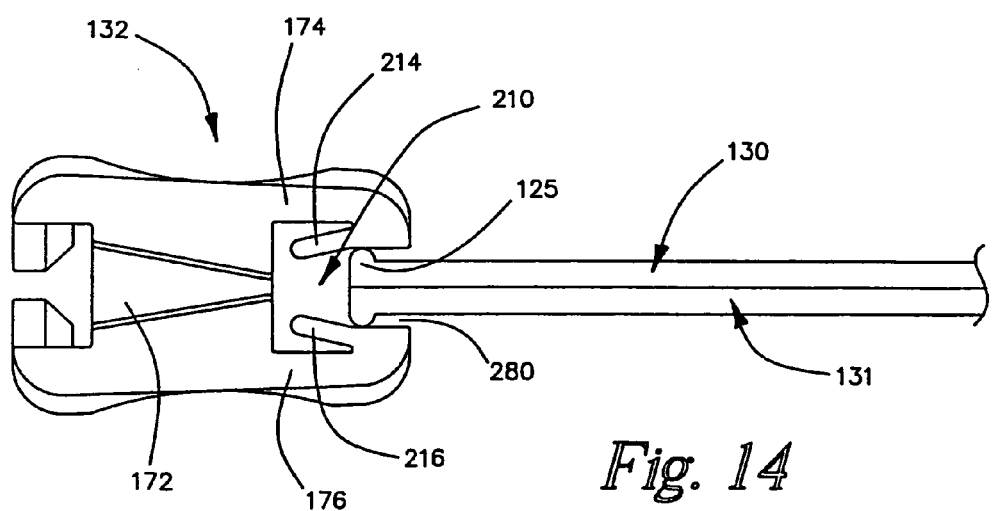
FIG. 14 is a top view of the slider and the fastening strips and illustrates their respective positions to one another as the fastening strips are positioned onto the slider.

FIGS. 14–18 sequentially illustrate the attachment of the slider 132 onto the fastening strips 130, 131 in the horizontal X axis 102. FIG. 14 depicts occluded fastening strips 130, 131 and a slider 132 having a flexible occlusion member 210 in a relaxed position. The occluded fastening strips 130, 131 are positioned between the first side portion 174 and the second side portion 176 immediately above the rear slot 280. Referring to FIG. 15, the fastening strips 130, 131 are moved in the horizontal X axis 102 toward the slider 132. The fastening strips 130, 131 engage the legs 214, 216 of the flexible occlusion member 210 and deflect the legs 214, 216 outwardly in the transverse Y axis 104 toward their respective side portions 174, 176 thus permitting passage of the seam 125 and fastening strips 130, 131. The seam 125 has protrusions 291, 292 which are created during the thermal cutting of the seam 125.

Figure 16A:
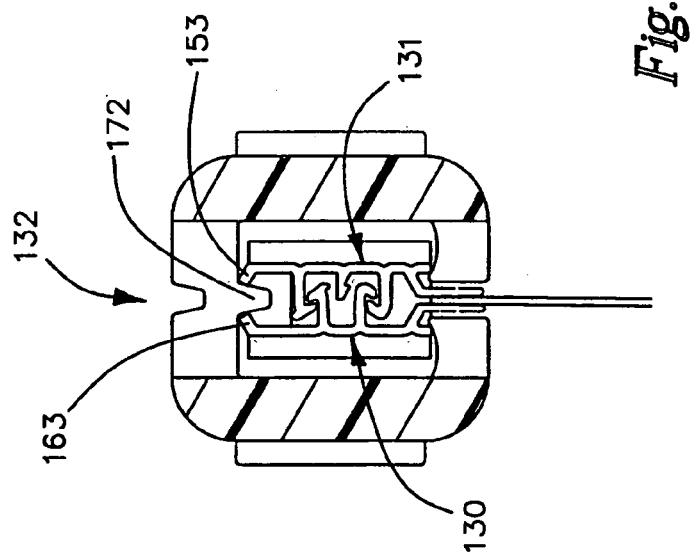
FIG. 16A is a cross-sectional view taken along line 16A—16A in FIG. 16.
Figure 16:
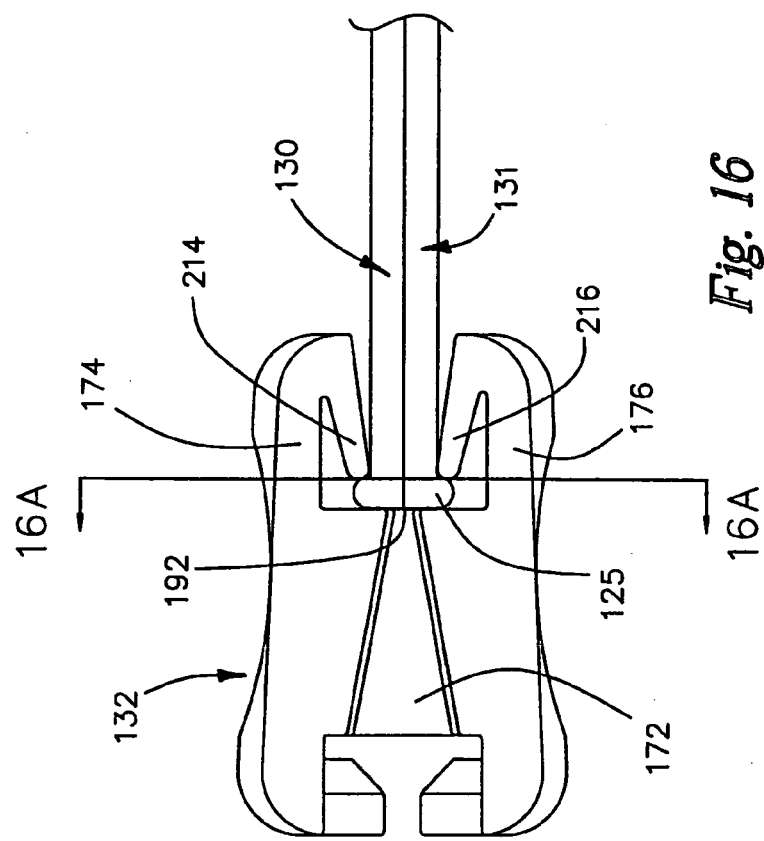
FIG. 16 is a top view of the slider and the fastening strips and illustrates their respective positions to one another as the fastening strips are positioned onto the slider.

As shown in FIG. 16, upon further movement of the fastening strips 130, 131 toward the slider 132 in the horizontal X axis 102, the seam 125 and the fastening strips 130, 131 project through the legs 214, 216 of the flexible occlusion member 210. The legs 214, 216 move toward each other after the seam 125 passes through the legs 214, 216 of the flexible occlusion member 210. The second end 192 of the separator 172 is positioned against the seam 125 of the fastening strips 130, 131 and is properly aligned to fit between the flanges 153, 163 of the fastening strips 130, 131 as seen in FIG. 16A.

As an aspect of the present invention, the flexible occlusion member 210 allows the slider 132 to accommodate fastening strips of different widths and/or varying width. Specifically, the flexible occlusion member can flex to accommodate fastening strips of different widths and/or varying widths, but can also exert sufficient force to occlude the fastening strips.

It will be appreciated by those skilled in the art that the present invention may be embodied in a variety of configurations. The resistance which the flexible occlusion member provides during attachment of the slider onto the fastening strips in the horizontal X axis may be affected by varying the dimensions and/or material composition of the slider design.

In addition, by properly selecting the slider material, the flexible occlusion member 210 can be relied upon to self adjust with time to the width of the fastening strips. Most plastics will "take a set" (self-adjust with time) to an external stress. Furthermore, due to manufacturing tolerances, the width of the fastening strips may vary along the length, and in addition the width of the slider may vary from one slider to another slider. As an example, if the fastening strips are wide, then the occlusion member 210 will self-adjust or take a set to the wide fastening strips and thereby allow the slider to maintain a low slide force. As another example, if the slider is narrow or tight fitting, then the occlusion member 210 will self-adjust or take a set to the narrow or tight fitting slider and thereby allow the slider to maintain a low slide force. As a further example, the occlusion member 210 will also self-adjust or take a set to narrow fastening strips and/or a wide slider. If the plastic material did not take a set, then wide fastening strips or a tight fitting slider would have a high slide force. Proper selection of material will allow the slider to self adjust to the width of the fastening strips soon after installation and prior to the expected delivery to the consumer.

Figure 18A:
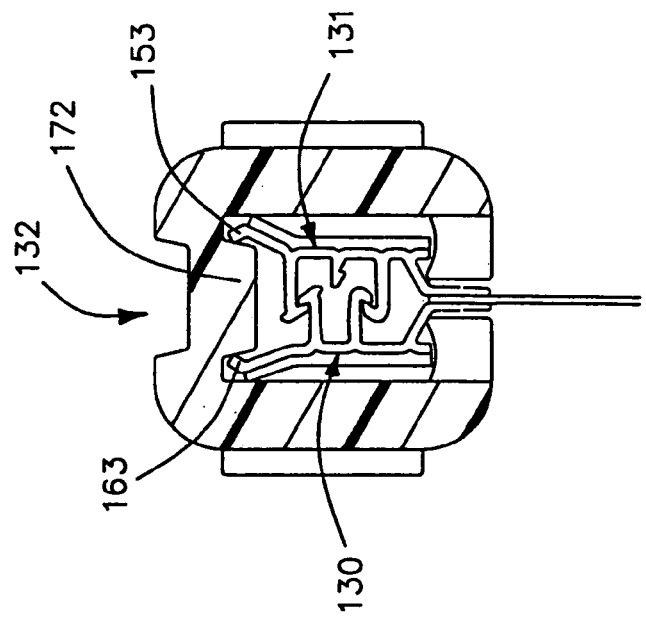
FIG. 18A is a cross-sectional view taken along line 18A—18A in FIG. 18.

As seen in FIG. 17, further movement of the fastening strips 130, 131 in the horizontal Z axis 102 forces the separator 172 of the slider 132 between the flanges 153, 163 of the fastening strips 130, 131. FIG. 17A shows the middle of separator 172 positioned between the fastening strips 130, 131 near the seam 125. In accordance with one feature of the invention, FIGS. 17A and 18A demonstrate that the fastening strips 130, 131 will have a leak proof seal when the slider 132 is in the end position.

The leak proof seal is created even though the separator 172 extends between flanges 153, 163 of the fastening strips 130, 131. Specifically, the fastening strips 130, 131 are effected not only by the forces acting upon them by the separator 172 at that location but are also by the position of the fastening strips 130, 131 at locations before and after that location. For example, with respect to the position of the fastening strips 130, 131 in FIGS. 17A and 18A, the webs 140, 141, 150, 151 are effected by the seam 125 at the end of the fastening strips 130, 131. The seam 125 prevents deocclsuion of the fastening strips by the separator 172.

Figure 18:
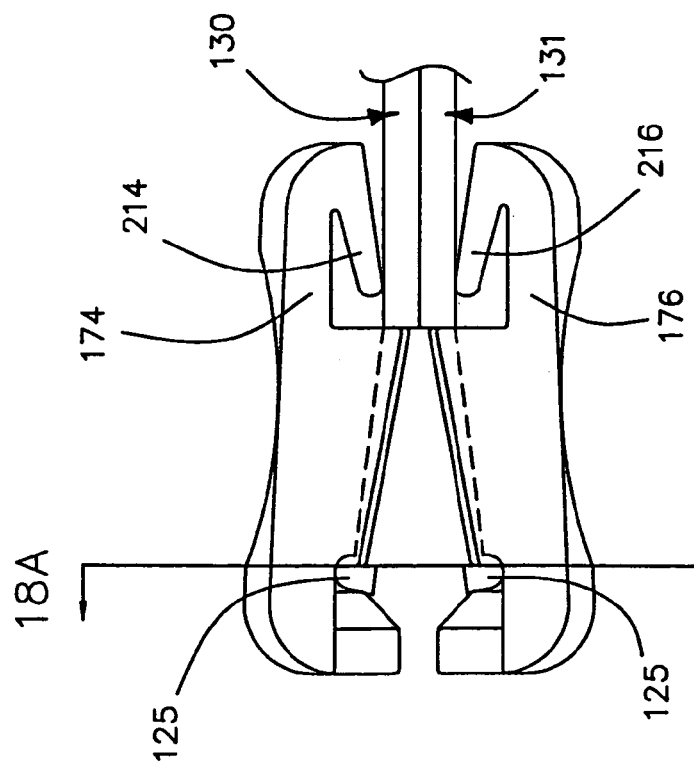
FIG. 18 is a top view of the slider and the fastening strips and illustrates their respective positions to one another as the fastening strips are positioned onto the slider.

When the separator 172 is positioned at the locations shown in FIGS. 17 and 18 (17A and 18A), the webs 140, 141, 150, 151 of the fastening strips 130, 131 would usually be deoccluded as shown in FIGS. 11–12. When the slider 132 moves to the locations shown in FIGS. 15–17, the webs 140, 141, 150, 151 are already occluded and the separating action of the separator 172 is not able to overcome the occlusion effect of the seam 125. Consequently, the fastening strips 130, 131 remain occluded through the length of the fastening strips and establish a leak proof seal when fully occluded.

It will be appreciated by those skilled in the art that a number of different methods may be used to attach sliders to fastening strips in the horizontal X axis. These methods may include manually inserting fastening strips through sliders. Because manual insertion is cumbersome and inefficient from an economic and production standpoint, automated insertion of the fastening strips through the sliders is desirable.

Figure 19:
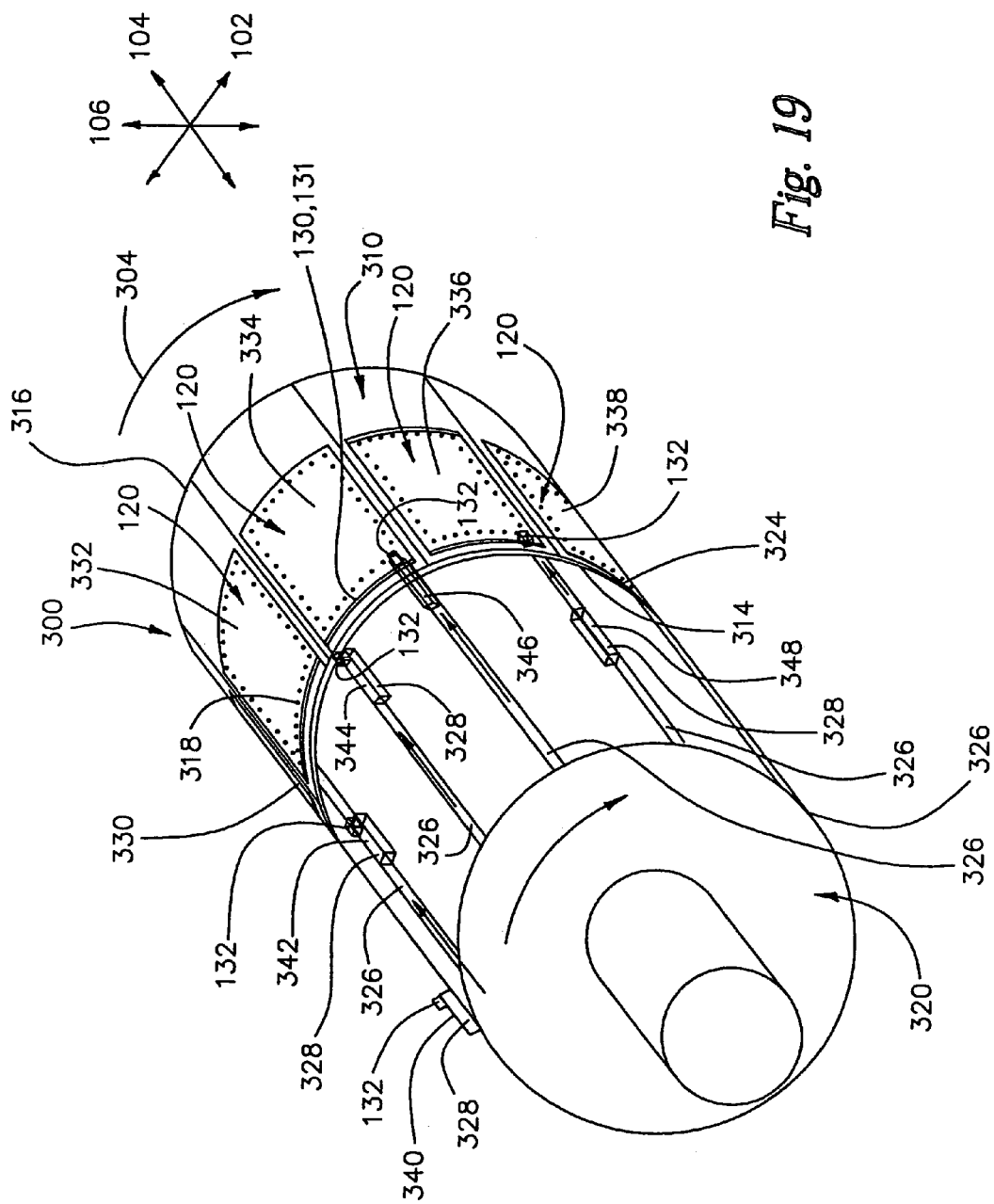
FIG. 19 is a perspective view of a system used to attach sliders onto containers in the horizontal X axis.

FIG. 19 illustrates an automated rotary system 300 that effectively inserts fastening strips 130, 131 through sliders 132 in the horizontal X axis 102. The rotary system 300 includes a first drum 310 and a second drum 320 which rotate about a single axis. The first drum 310 has a first end 314 and a second end 316 and rotates in a clockwise direction 304 at a first radial speed as viewed in FIG. 19. The perimeter of the first drum 310 provides holes 318 to which a controllable vacuum is connected. The vacuum holes 318 provide a means for securing the containers 120 to and releasing the containers 120 from the perimeter of the first drum 310 during production. The containers 120 are positioned onto the first drum 310 such that the fastening strips 130, 131 of the containers 120 are disposed along the first end 314 of the first drum 310.

The second drum 320 has a first end 324 and a second end 326 and rotates at a second radial speed also in a clockwise direction 304 as viewed in FIG. 19. The second radial speed is less than the first radial speed. Accordingly, the first drum 310 rotates faster than the second drum 320. The second drum 320 includes a number of axially extending channels 326. Disposed within each channel 326 is a slider retaining cartridge 328.

In operation, a container 120 is placed on the first drum 310 at position 330 or an earlier position. The vacuum of the first drum 310 is used to attach the container 120 to the surface of the first drum. The containers 120 rotate as the first drum 310 rotates and the containers achieve various positions 330, 332, 334, 336, 338 as shown in FIG. 19. The cartridges 328 of the second drum 320 receive sliders 132 at the second end 326 of the second drum 320 at position 340 or an earlier position. The cartridges 328 and sliders 132 rotate as the second drum 320 rotates and the cartridges 328 achieve various positions 340, 342, 344, 346, 348 as shown in FIG. 19. The cartridges 328 with the sliders 132 move to the first end 324 of the second drum 320 and achieve various positions 340, 342, 344, 346 as shown in FIG. 19. Prior to position 346, the sliders extend beyond the second drum 320 and into the path of the containers 120 on the first drum 310.

The containers 120 attached to the first drum 310 are traveling at a greater radial speed than the sliders 132 and cartridges 328 on the second drum 320. Consequently, each set of fastening strips 130, 131 are inserted within a slider 132 in the horizontal X axis 102 as the fastening strips 130, 131 pass a cartridge 328 and slider 132 as shown in position 346. After the fastening strips 130, 131 are inserted within the slider 132, the slider 132 is disengaged from the cartridge 328 as shown in position 348. The container 120 with the slider 132 then rotates on the first drum 310 to position 346 or a later position and the vacuum retaining the container 120 to the first drum 310 is momentarily turned off to release the container 120 with the slider 132. The vacuum is subsequently turned on to secure another container 120 to the surface of the first drum 310 to repeat the process.

Figure 20:
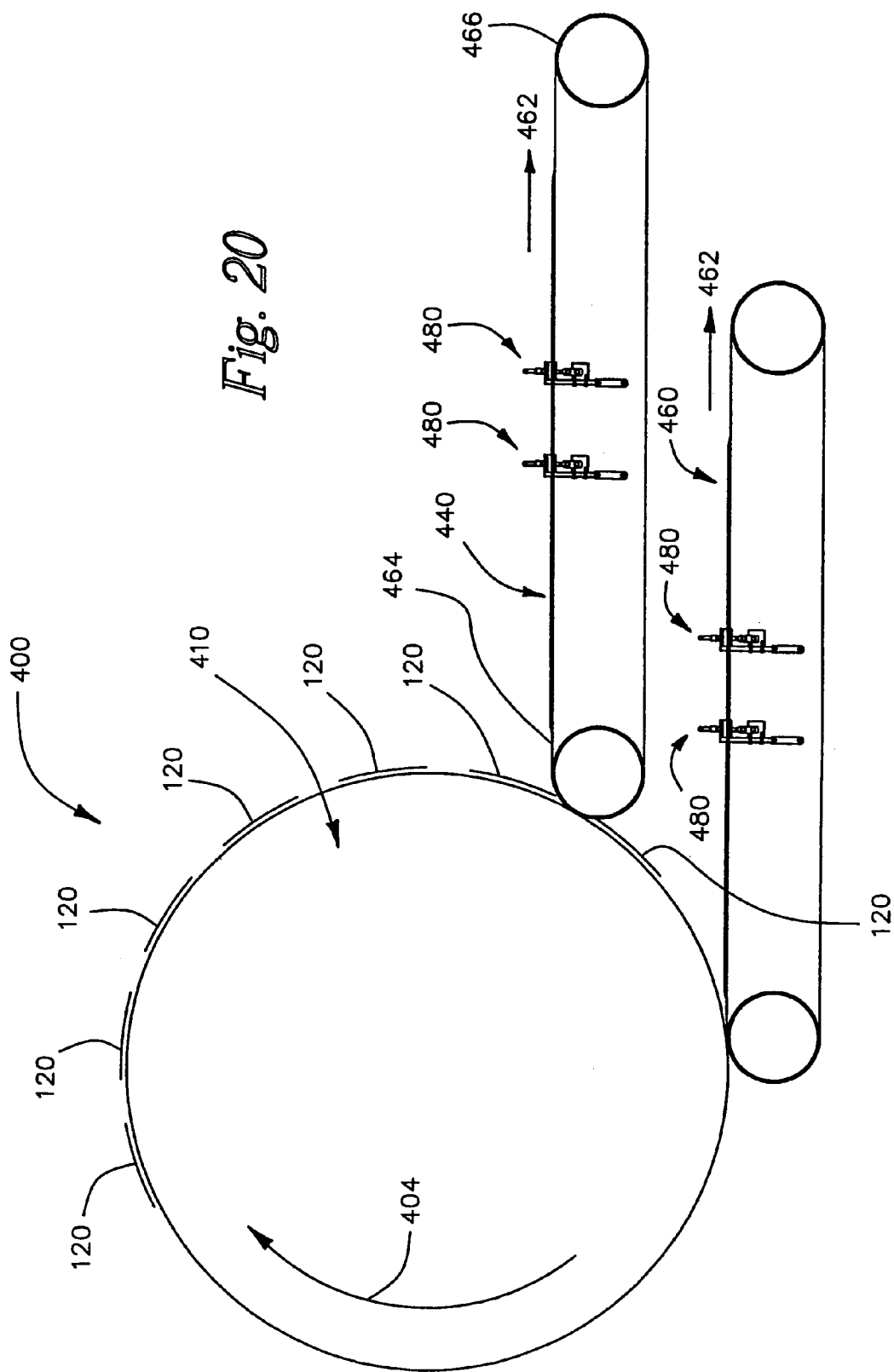
FIG. 20 is a side view of another embodiment of a system used to attach sliders onto containers in the horizontal X axis.
Figure 21:
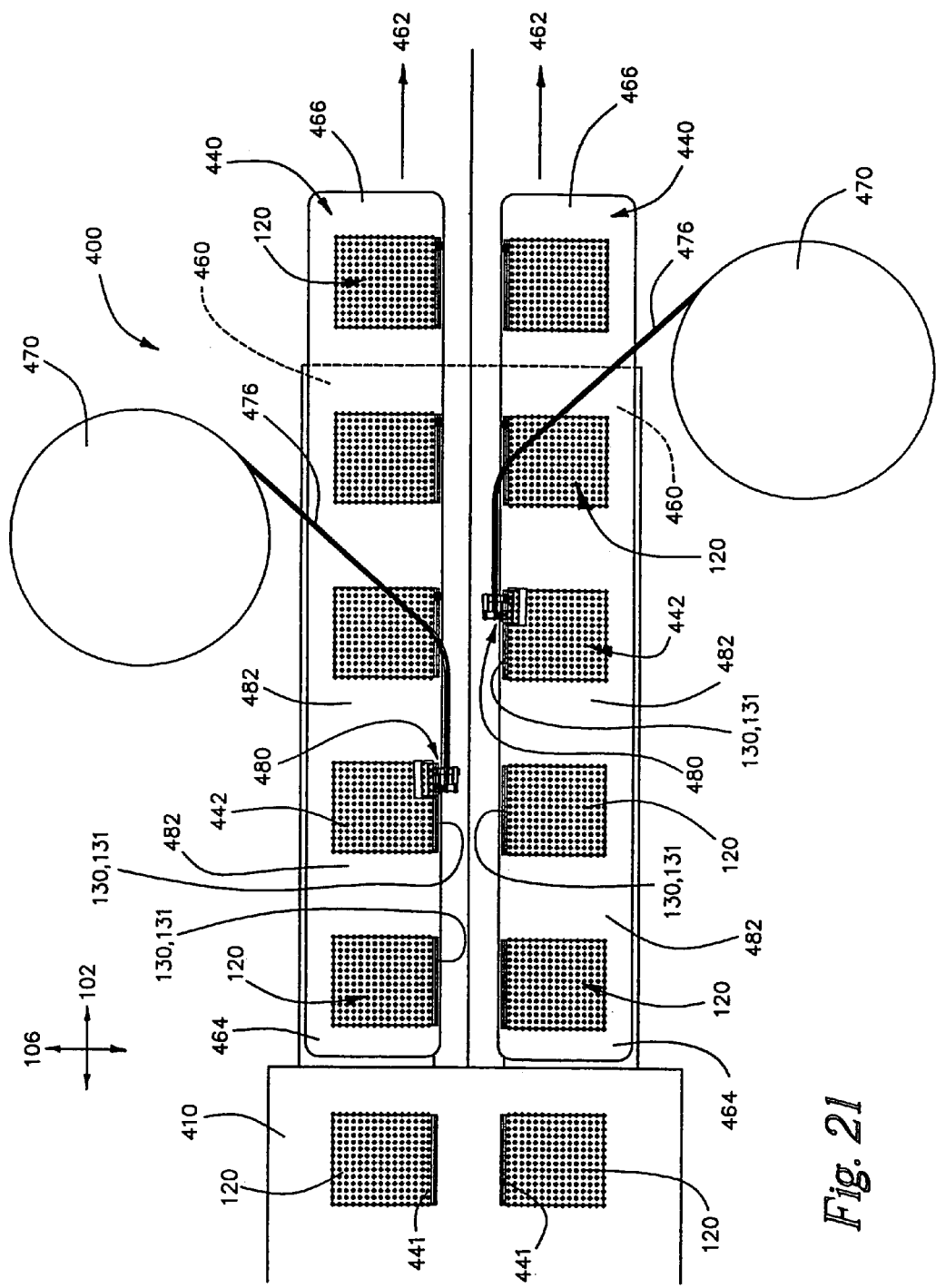
FIG. 21 is a top view of the system in FIG. 20.

Another embodiment of an automated production system that attaches fastening strips 130, 131 to sliders 132 in the horizontal X axis 102 is illustrated in FIGS. 20 and 21. This conveyor system 400 may include any number of conveyors 440, 460 and slider feeders 470. However, for purposes of clarity and convenience, the description will be limited to an upper conveyor 440 and a lower conveyor 460. The conveyor system 400 illustrated in FIGS. 20 and 21 includes a drum 410, an upper conveyor 440, a lower conveyor 440 and a slider feeder 470.

The drum 410 rotates in a clockwise direction 404 as viewed in FIG. 21 and supplies containers 120 to the upper conveyor 440 and lower conveyor 460. The perimeter of the drum 410 provides holes 441 to which a controllable vacuum is connected. The vacuum holes 441 provide a means for securing containers 120 to and releasing containers 120 from the perimeter of the drum 410 during production.

The conveyors 440, 460 also provide holes 442 to which a controllable vacuum is connected. The vacuum holes 442 provide a means for securing containers 120 to and releasing containers 120 from the conveyors 440, 460 during production. The containers 120 are positioned onto the conveyors 440, 460 by the drum 410 such that the fastening strips 130, 131 are located on the inside edge of its respective conveyor. The conveyors 440, 460 move in direction 462 and the containers 120 travel from the first end 464 of the conveyors to the second end 466 of the conveyors.

Slider feeders 470 such as vibrating drum feeders are provided to supply sliders 132 through a channel 476 to the slider holding mechanism 480. The slider holding mechanism 480 is located at the inside edge of each conveyor. As the container 120 with the fastening strips 130, 131 travels along the conveyor 440, 460 and reaches the slider holding mechanism 480, the conveyor 440, 460 moves the fastening strips 130, 131 through the slider 132 in the horizontal X axis 102. After the slider 132 has been inserted on the fastening strips, the slider 132 is released from slider holding mechanism 480. The container 120 with the slider 132 then travels to the second end 466 of the conveyor 440, 460 until the vacuum retaining the container 120 to the conveyor 440, 460 is momentarily turned off to release the container with the slider.

The lower conveyor 460 operates in a similar fashion. The purpose of using upper and lower conveyors 440, 460 is to create space 482 between the containers 120. As the drum 410 rotates, the containers 120 are placed on the conveyors 440, 460 in an alternating fashion. For example, a first container 120 is placed on conveyor 440, a second container 120 is placed on conveyor 460, a third container 120 is placed on conveyor 440, a fourth container 120 is placed on a conveyor 440 and this alternating sequence continues. Thus, the alternating sequence creates the space 482 between the containers on the conveyors 440, 460.

Figure 24:
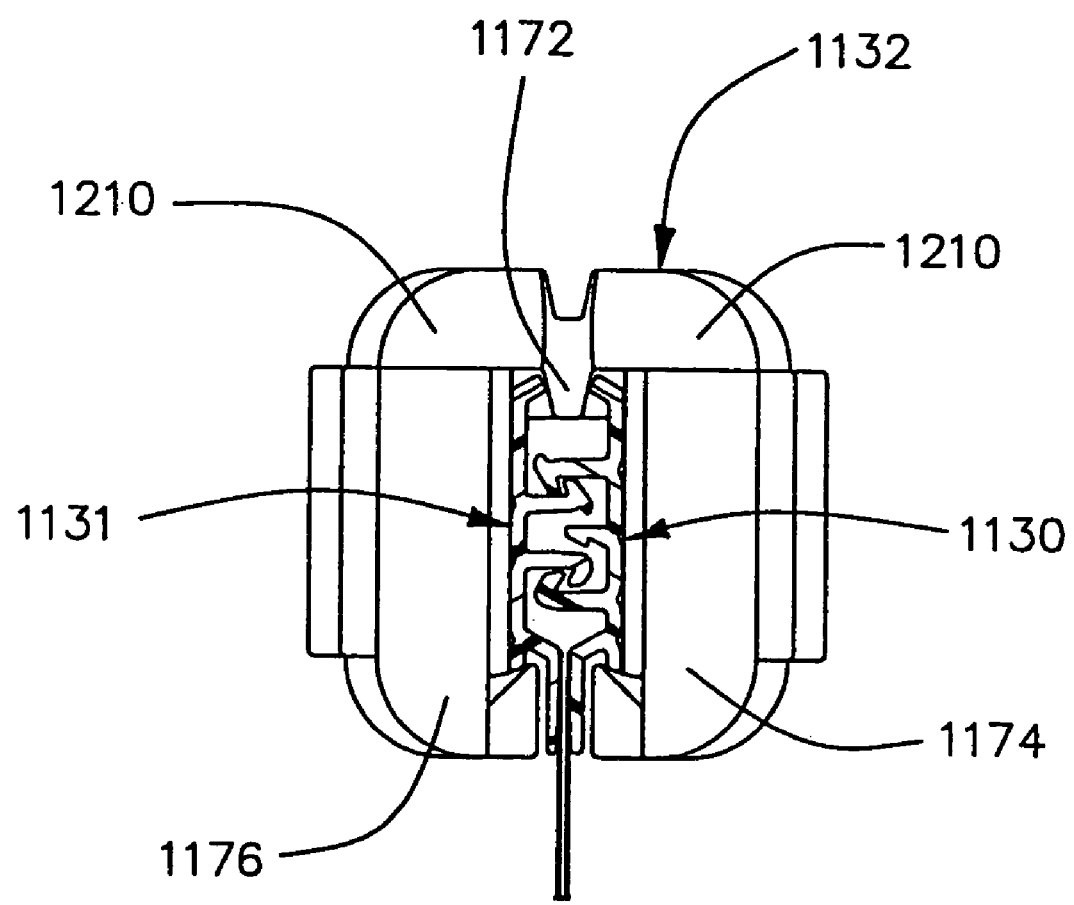
FIG. 24 is an enlarged partial cross-sectional view taken along line 24—24 in FIG. 22.

The present invention also prevents removal of the slider from the fastening strips in the horizontal X axis 102 once the slider has been attached to the fastening strips. FIGS. 22–27 illustrate a slider 1132 having a first and second set of retaining jaws 1200, 1210. The first set of retaining jaws 1200 are provided at the first end 1190 of the slider 1132. The second set of retaining jaws 1210 are provided at the second end 1192 of the slider 1132. As most easily seen in FIGS. 23–24, the retaining jaws 1200, 1210 extend outward from the top of the slider 1132 and angle inwardly in the transverse Y axis 104 to form a first upper slot 1270 and a second upper slot 1272. When the slider 1132 is attached to the fastening strips 1130, 1131, the retaining jaws 1200, 1210 are positioned above the top of the fastening strips 1130, as seen in FIGS. 22 and 24.

FIGS. 22–23 illustrate first and second crimped end stops 1135, 1137 provided at each end of the fastening strips 1130, 1131. The end stops 1135, 1137 include detents 1140 and protrusions 1142 for engagement with the retaining jaws 1200, 1210. The crimped end stops 1135, 1137 also extend above the top of the fastening strips 1130, 1131 to correspond with the vertical position of the retaining jaws 1200, 1210. Once the slider 1132 is moved a sufficient distance along the fastening strips 1130, 1131 in the horizontal X axis 102, the respective retaining jaws 1200, 1210 engages the corresponding crimped end stop 1135, 1137.

Figure 25:
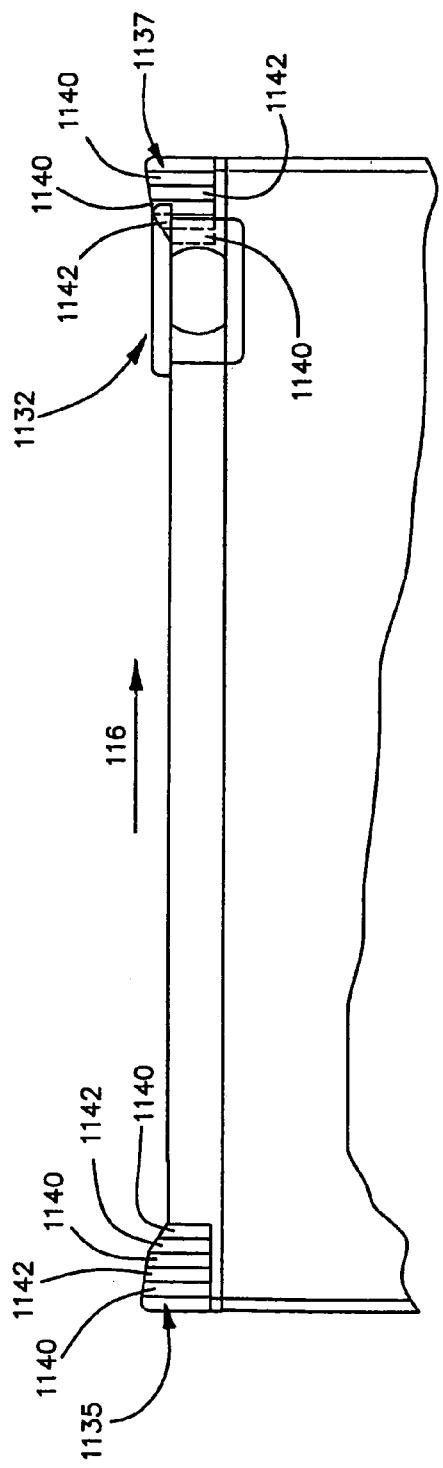
FIG. 25 is a side view of the slider engaged with an end stop of the fastening strips in FIG. 22.
Figure 26:
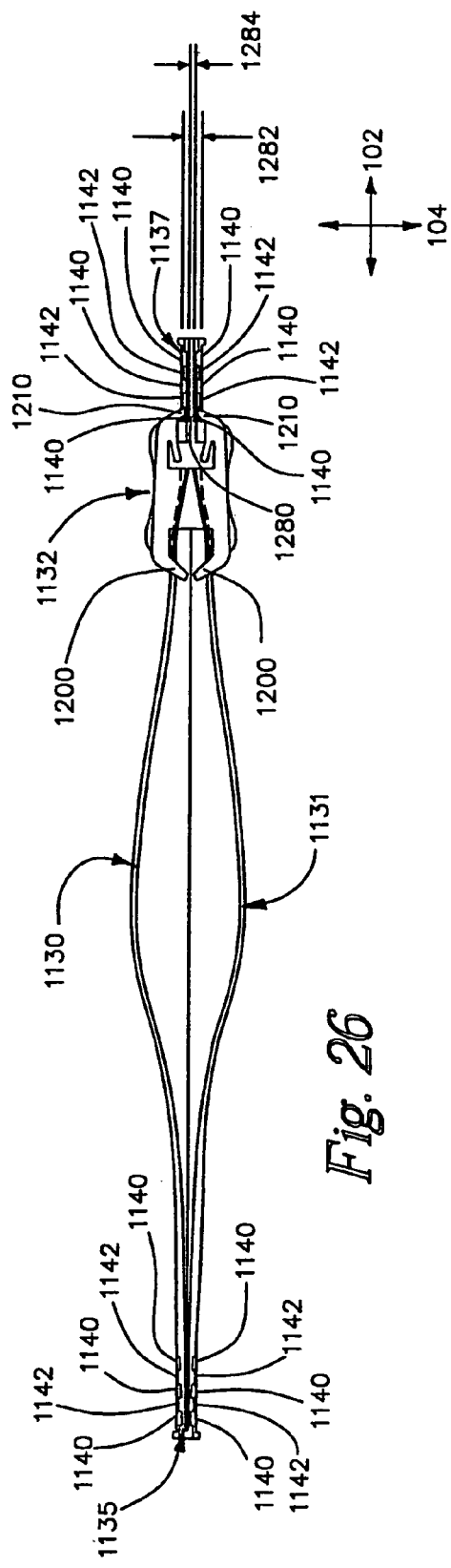
FIG. 26 is a top view of the slider engaged with the end stop of the fastening-strips in FIG. 22.

For example, if the slider 1132 is continually moved in the deocclusion direction 116, the second set of retaining jaws 1210 will eventually engage detents 1140 and protrusions 1142 on the crimped end stop 1137 as shown in FIGS. 25–26. Specifically, the upper slot 1272 has a width 1280 which is less than the width 1282 of the protrusions 1142 on the end stop 1137. In addition, the width 1280 of the upper slot is equal to or less than the width 1284 of the detents 1140. As the jaws 1210 engage the end stop 1137, the jaws 1210 engage the detents 1140. As the jaws 1210 move forward, the jaws engage the protrusions 1142 and are stopped by the protrusions 1142. The width 1280 of the slot is less than the width 1282 of the protrusions 1142. In addition, the jaws 1210 are not able to deflect to increase the width 1280 of the slot. Thus, the retaining jaws 1210 will resist further movement of the slider 1132 in the horizontal X axis 102 in the deocclusion direction 116. As a result, the slider 1132 may only be removed from the fastening strips 1130, 1131 in the horizontal X axis 102 by either tearing through the end stops or by breaking and/or deforming the retaining jaws 1200, 1210 of the slider 1132.

Figure 27:
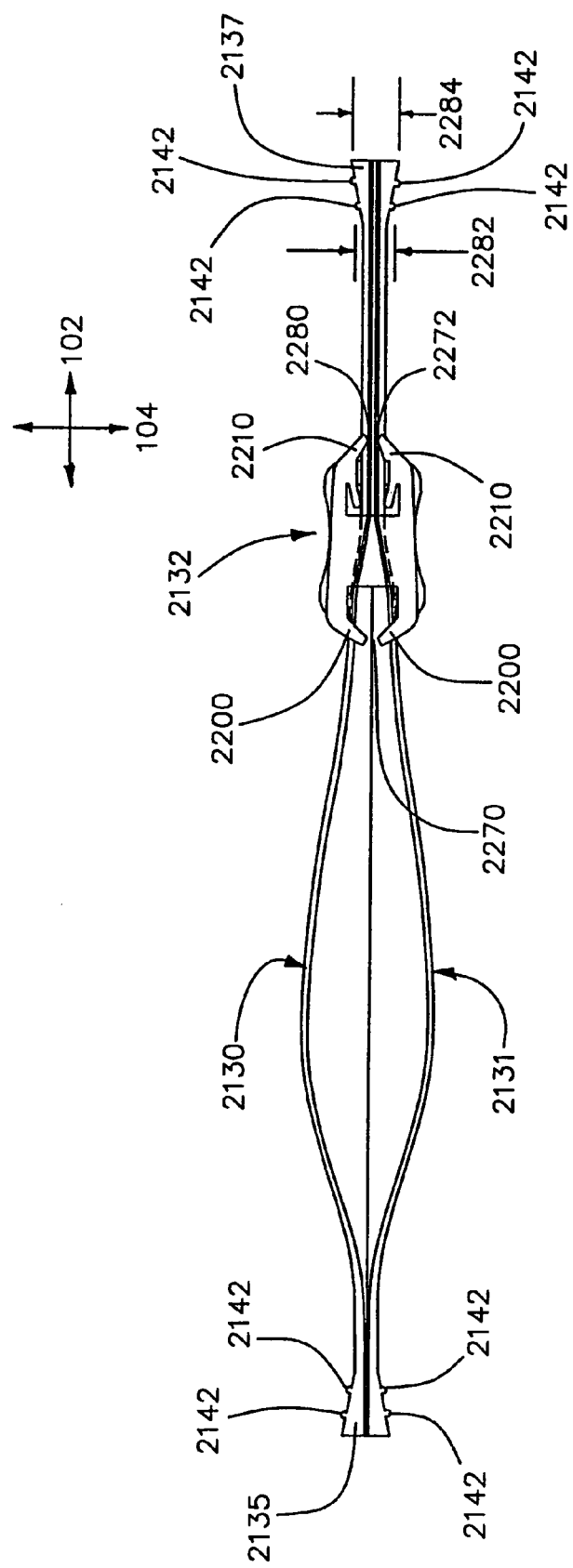
FIG. 27 is a top view of the slider and another embodiment of the fastening strips.

FIG. 27 illustrates another embodiment of end stops 2135, 2137 that may be used with the retaining jaws 2200, 2210 similar to the embodiment shown in FIGS. 22–26. However, the wedge end stops 2135, 2137 of FIG. 27 angle outwardly at the respective ends of the fastening strips 2130, 2131 thereby increasing the width 2284 of the end stop. The retaining jaws 2200, 2210 also utilize the increase in the width 2284 of the end stops 2135, 2137 to engage the retaining jaws 2200, 2210 as well as the protrusions 2142 provided along the outer surface of the wedge stops 2135, 2137. The width 2284 of the wedge end stops 2135, 2137 increases to a width greater than the width 2280 of the upper slots 2270, 2272. Once the retaining jaws 2200, 2210 engage the end stops 2135, 2137, the width 2284 of the end stops and the width 2282 of the protrusions 2142 prevent further horizontal movement of the slider 2132 in the horizontal X axis 102.

In another embodiment, the slider may have a single jaw on the end of the slider to engage the end stop. Since the jaw will not deflect, the slider will stop when the jaw engages the protrusion and/or the increasing width of the end stop. Furthermore, in an additional embodiment, the slider may have a single jaw on each end of the slider.

Figure 28:
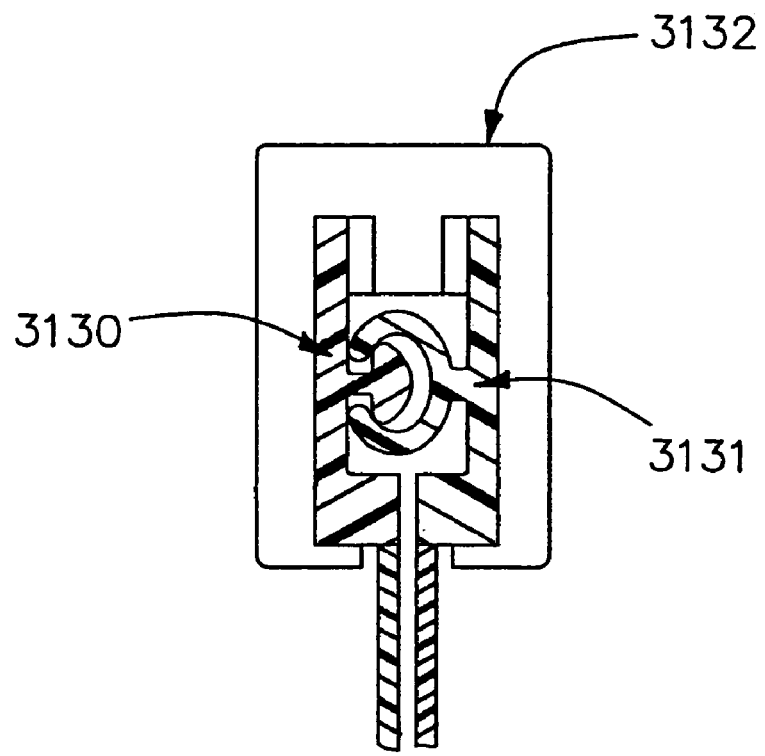
FIG. 28 is a rear view of another embodiment of the slider and a cross-sectional view of another embodiment of the fastening strips.
Figure 29:
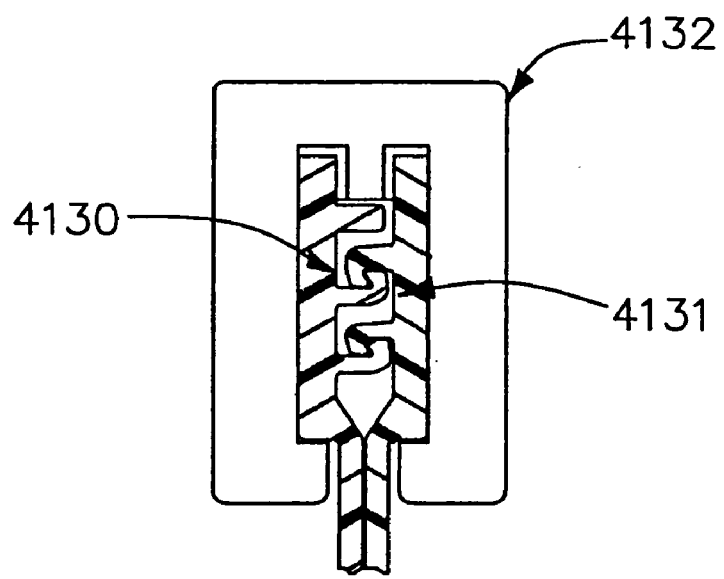
FIG. 29 is a rear view of another embodiment of the slider and a cross-sectional view of another embodiment of the fastening strips.

FIGS. 28–29 illustrate interlocking fastening strips of different configurations and the corresponding slider design. As shown in FIG. 28, the interlocking fastening strips 3130, 3131 may alternatively comprise "arrowhead-type" closure elements which are used with a slider 3132.

Additionally, the interlocking fastening strips 4130, 4131 may comprise "profile" closure elements which are used with a slider 4132, as shown in FIG. 29. These closure elements are described in U.S. Pat. No. 5,664,299.

Although several interlocking fastening strip embodiments have been specifically described and illustrated herein, it will be readily appreciated by those skilled in the art that other kinds, types, or forms of fastening strips may alternatively be used without departing from the scope or spirit of the present invention.

The interlocking fastening strips of the present invention may be manufactured by extrusion through a die. In addition, the fastening strips may be manufactured to have approximately uniform cross-sections. This not only simplifies the manufacturing of a closure device, but also contributes to the physical flexibility of the closure device.

Generally, the interlocking fastening strips of the present invention may be formed from any suitable thermoplastic material including, for example, polyethylene, polypropylene, nylon, or the like, or from a combination thereof. Thus, resins or mixtures of resins such as high density polyethylene, medium density polyethylene, and low density polyethylene may be employed to prepare the interlocking fastening strips of the present invention. In most instances, the fastening strips are made from low density polyethylene. The selection of the appropriate thermoplastic material, however, is related to the particular design of the fastening strips, the Young's Modulus of the thermoplastic material, and the desired elasticity and flexibility of the strips.

When the fastening strips of the present invention are used in a sealable bag, the fastening strips and the films that form the body of the bag may be conveniently manufactured from heat sealable material. In this way, the bag may be economically formed by using an aforementioned thermoplastic material and by heat sealing the fastening strips to the bag. In most instances, the bag is made from a mixture of high pressure, low density polyethylene and linear, low density polyethylene.

The fastening strips of the present invention may be manufactured by extrusion or other known methods. For example, the closure device may be manufactured as individual fastening strips for later attachment to the bag or may be manufactured integrally with the bag. In addition, the fastening strips may be manufactured with or without flange portions on one or both of the fastening strips depending upon the intended use of the closure device or expected additional manufacturing operations.

Generally, the closure device of the present invention can be manufactured in a variety of forms to suit the intended use. In practicing the present invention, the closure device may be integrally formed on the opposing side walls of the container or bag, or connected to the container by the use of any of many known methods. For example, a thermoelectric device may be applied to a film in contact with the flange portion of the fastening strips or the thermoelectric device may be applied to a film in contact with the base portion of fastening strips having no flange portion, to cause a transfer of heat through the film to produce melting at the interface of the film and a flange portion or base portion of the fastening strips. Suitable thermoelectric devices include heated rotary discs, traveling heater bands, resistance-heated slide wires, and the like. The connection between the film and the fastening strips may also be established by the use of hot melt adhesives, hot jets of air to the interface, ultrasonic heating, or other known methods. The bonding of the fastening strips to the film stock may be carried out either before or after the film is U-folded to form the bag. In any event, such bonding is done prior to side sealing the bag at the edges by conventional thermal cutting. In addition, the first and second fastening strips may be positioned on opposite sides of the film. Such an embodiment would be suited for wrapping an object or a collection of objects such as wires. The first and second fastening strips should usually be positioned on the film in a generally parallel relationship with respect to each other, although this will depend on the intended use.

The slider may be multiple parts and snapped together. In addition, the slider may be made from multiple parts and fused or welded together. The slider may also be a one piece construction. The slider can be colored, opaque, translucent or transparent. The slider may be injection molded or made by any other method. The slider may be molded from any suitable plastic material, such as, nylon, polypropylene, polystyrene, acetal, toughened acetal, polyketone, polybutylene terrephthalate, high density polyethylene, polycarbonate or ABS (acrylonitrile-butadiene-styrene).

In summary, the present invention affords a closure device with interlocking fastening strips, a slider which facilitates the occlusion and deocclusion of the fastening strips, and a method which facilitates attachment of the slider onto the fastening strips in the horizontal X axis. In addition, the closure device prevents the removal of the slider from the fastening strips in the horizontal x axis and in the vertical Z axis.

From the foregoing it will be understood that modifications and variations may be effectuated to the disclosed structures—particularly in light of the foregoing teachings—without departing from the scope or spirit of the present invention. As such, no limitation with respect to the specific embodiments described and illustrated herein is intended or should be inferred. Indeed, the following claims are intended to cover all modifications and variations that fall within the scope and spirit of the present invention. In addition, all references and copending applications cited herein are hereby incorporated by reference in their entireties.

What is claimed is:

1. A closure device comprising:
   a first fastening strip;
   a second fastening strip;
   a slider adapted to be slidably disposed on said fastening strips and facilitating the occlusion of said fastening strips when moved in an occlusion direction towards a first end thereof and facilitating the deocclusion of said fastening snips when moved towards a second end thereof, said fastening strips and said slider having a longitudinal X axis and a transverse Y axis, said transverse Y axis being perpendicular to said longitudinal X axis, said fastening strips and said slider having a vertical Z axis, said vertical Z axis being perpendicular to said longitudinal X axis, said vertical Z axis being perpendicular to said transverse Y axis, said slider comprising a housing having a first side portion, a second side portion and a flexible occlusion member for facilitating occlusion of said fastening strips when said slider is moved to said first end of said fastening strips; wherein said flexible occlusion member comprises a first leg for engaging said first fastening strip and a second leg for engaging said second fastening strip, wherein said first and second legs extend inwardly in the longitudinal X axis towards the occlusion direction from the first and second side portions, respectively.

2. The closure device as in claim 1 wherein said fastening strips are disposed between said first and second legs.

3. The closure device as in claim 1 wherein said flexible occlusion member has a first position prior to attaching said slider to the first fastening strip and a second position when said flexible occlusion member is attached the first fastening strip.

4. The closure device as in claim 3 wherein the second position is deflected from the first position.

5. The closure device as in claim 1 wherein said first leg has a first position prior to attaching said slider to the first fastening strip and a second position when said first leg is attached to the first fastening strip.

6. The closure device as in claim 5 wherein the second position is deflected from the first position.

7. The closure device as in claim 1 wherein said first leg flexes for facilitating the attachment of said slider onto said fastening strips in said longitudinal X axis.

8. The closure device as in claim 1 wherein said second leg flexes for facilitating the attachment of said slider onto said fastening strips in said longitudinal X axis.

9. The closure device as in claim 1 wherein said fastening strips have a first width and a second width, said flexible occlusion member has a first position for the first width and a second position for the second width.

10. The closure device as in claim 9 wherein said flexible occlusion member will take a set to the first position.

11. The closure device as in claim 9 wherein said flexible occlusion member will take a set to the second position.

12. The closure device as in claim 1 wherein said fastening strips have a first width, said slider can be used with a second set of fastening strips having a second width, said flexible occlusion member has a first position for the first width and a second position for the second width.

13. The closure device as in claim 12 wherein said flexible occlusion member will take a set to the first position.

14. The closure device as in claim 12 wherein said flexible occlusion member will take a set to the second position.

15. The closure device as in claim 1 wherein said fastening strips comprise U-channel type fastening strips.

16. The closure device as in claim 1 wherein said fastening strips comprise arrowhead type fastening strips.

17. The closure device as in claim 1 wherein said fastening strips comprise profile type fastening strips.

18. A slider adapted to be slidably disposed on first and second fastening strips, said slider facilitating the occlusion of said fastening strips when moved in an occlusion direction towards a first end thereof and facilitating the deocclusion of said fastening strips when moved towards a second end thereof, said slider comprising:
 a longitudinal X axis and a transverse Y axis, said transverse Y axis being perpendicular to said longitudinal X axis, said slider having a vertical Z axis, said vertical Z axis being perpendicular to said longitudinal X axis, said vertical Z axis being perpendicular to said transverse Y axis;
 a housing having a first side portion, a second side portion and a flexible occlusion member for facilitating occlusion of said fastening strips when said slider is moved to said first end of said fastening strips; wherein said flexible occlusion member comprises a first leg for engaging said first fastening strip and a second leg for engaging said second fastening strip, wherein said first and second legs extend inwardly in the longitudinal X axis towards the occlusion direction from the first and second side portions, respectively.

19. The slider as in claim 18, wherein said flexible occlusion member comprises a second inwardly biased leg for engaging said second fastening strip.

20. The slider as in claim 18 wherein said fastening strips are disposed between said first and second legs.

21. The slider as in claim 18 wherein said flexible occlusion member has a first position prior to attaching said slider to the first fastening strip and a second position when said flexible occlusion member is attached to the first fastening strip.

22. The slider as in claim 21 wherein the second position is deflected from the first position.

23. The slider as in claim 18 wherein said first leg has a first position prior to attaching said slider to the first fastening strip and a second position when said first leg is attached to the first fastening strip.

24. The slider as in claim 23 wherein the second position is deflected from the first position.

25. The slider as in claim 18 wherein said first leg flexes for facilitating the attachment of said slider onto said fastening strips in said longitudinal X axis.

26. The slider as in claim 18 wherein said second leg flexes for facilitating the attachment of said slider onto said fastening strips in said longitudinal X axis.

27. The slider as in claim 18 wherein said fastening strips have a first width and a second width, said flexible occlusion member has a first position for the first width and a second position for the second width.

28. The slider as in claim 27 wherein said flexible occlusion member will take a set to the first position.

29. The slider as in claim 27 wherein said flexible occlusion member will take a set to the second position.

30. The slider as in claim 18 wherein said fastening strips have a first width, said slider can be used with a second set of fastening strips having a second width, said flexible occlusion member has a first position for the first width and a second position for the second width.

31. The slider as in claim 30 wherein said flexible occlusion member will take a set to the first position.

32. The slider as in claim 30 wherein said flexible occlusion member will take a set to the second position.

33. A container comprising:
 first and second side walls, said first and second side walls including mating first and second fastening strips respectively, said first and second fastening strips comprising a closure device arranged to be interlocked over a predetermined length,
 a slider adapted to be slidably disposed on said fastening strips and facilitating the occlusion of said fastening strips when moved in an occlusion direction towards a first end thereof and facilitating the deocclusion of said fastening strips when moved towards a second end thereof, said fastening strips and said slider having a longitudinal X axis and a transverse Y axis, said transverse Y axis being perpendicular to said longitudinal X axis, said fastening strips and said slider having a vertical Z axis, said vertical Z axis being perpendicular to said longitudinal X axis, said vertical Z axis being perpendicular to said transverse Y axis, said slider comprising a housing having a first side portion, a second side portion and a flexible occlusion member for facilitating occlusion of said fastening strips when said slider is moved to said first end of said fastening strips; wherein said flexible occlusion member comprises a first leg for engaging said first fastening strip and a second for engaging said second fastening strip, wherein said first and second legs extend inwardly in the longitudinal X axis towards the occlusion direction from the first and second side portions, respectively.

34. The container as in claim 33 wherein said fastening strips are disposed between said first and second legs.

35. The container as in claim 33 wherein said flexible occlusion member has a first position prior to attaching said slider to the first fastening strip and a second position when said flexible occlusion member is attached to the first fastening strip.

36. The container as in claim 35 wherein the second position is deflected from the first position.

37. The container as in claim 33 wherein said first leg has a first position prior to attaching said slider to the first fastening strip and a second position when said first leg is attached to the first fastening strip.

38. The container as in claim 37 wherein the second position is deflected from the first position.

39. The container as in claim 33 wherein said first leg flexes for facilitating the attachment of said slider onto said fastening strips in said longitudinal X axis.

40. The container as in claim 33 wherein said second leg flexes for facilitating the attachment of said slider onto said fastening strips in said longitudinal X axis.

41. The container as in claim 33 wherein said fastening strips have a first width and a second width, said flexible occlusion member has a first position for the first width and a second position for the second width.

42. The container as in claim 41 wherein said flexible occlusion member will take a set to the first position.

43. The container as in claim 41 wherein said flexible occlusion member will take a set to the second position.

44. The container as in claim 33 wherein said fastening strips have a first width, said slider can be used with a second set of fastening strips having a second width, said flexible occlusion member has a first position for the first width and a second position for the second width.

45. The container as in claim 44 wherein said flexible occlusion member will take a set to the first position.

46. The container as in claim 44 wherein said flexible occlusion member will take a set to the second position.

47. The container as in claim 33 wherein said fastening strips comprise U-channel type fastening strips.

48. The container as in claim 33 wherein said fastening strips comprise arrowhead type fastening strips.

49. The container as in claim 33 wherein said fastening strips comprise profile type fastening strips.

50. A slider adapted to be slidably disposed on first and second fastening strips, said slider facilitating the occlusion of said fastening strips when moved in an occlusion direction towards a first end thereof and facilitating the deocclusion of said fastening strips when moved towards a second end thereof, said slider comprising:

a longitudinal X axis and a transverse Y axis, said transverse Y axis being perpendicular to said longitudinal X axis, said slider having a vertical Z axis, said vertical Z axis being perpendicular to said longitudinal X axis, said vertical Z axis being perpendicular to said transverse Y axis;

a housing having a flexible occlusion member for facilitating occlusion of said fastening strips when said slider is moved to said first end of said fastening strips, wherein said flexible occlusion member comprises a first leg for engaging said first fastening strip and a second leg for engaging said second fastening strip, wherein said legs extend in the longitudinal X axis toward the occlusion direction and flex in the direction of the transverse Y axis.

* * * * *